(12) United States Patent
Liu et al.

(10) Patent No.: US 10,844,249 B2
(45) Date of Patent: Nov. 24, 2020

(54) STRESS TEARABLE TAPE

(71) Applicants: An-Hsia Liu, Gardena, CA (US);
Victor D. Liu, Gardena, CA (US);
Alexander D. Liu, Gardena, CA (US)

(72) Inventors: An-Hsia Liu, Gardena, CA (US);
Victor D. Liu, Gardena, CA (US);
Alexander D. Liu, Gardena, CA (US)

(*) Notice: Subject to any disclaimer, the term of this patent is extended or adjusted under 35 U.S.C. 154(b) by 135 days.

(21) Appl. No.: 15/975,755

(22) Filed: May 9, 2018

(65) Prior Publication Data
US 2019/0233680 A1 Aug. 1, 2019

Related U.S. Application Data

(60) Provisional application No. 62/709,838, filed on Feb. 1, 2018.

(51) Int. Cl.
| | |
|---|---|
| B65H 16/02 | (2006.01) |
| B65H 18/08 | (2006.01) |
| C09J 7/25 | (2018.01) |
| C09J 7/24 | (2018.01) |
| B23K 26/382 | (2014.01) |
| B26F 1/24 | (2006.01) |
| B23K 26/08 | (2014.01) |

(52) U.S. Cl.
CPC .............. *C09J 7/255* (2018.01); *C09J 7/243* (2018.01); *B23K 26/0846* (2013.01); *B23K 26/382* (2015.10); *B26F 1/24* (2013.01); *B65H 16/025* (2013.01); *B65H 18/08* (2013.01); *C09J 2423/046* (2013.01); *C09J 2423/106* (2013.01); *C09J 2467/006* (2013.01)

(58) Field of Classification Search
CPC ...... C09J 7/255; C09J 7/243; C09J 2423/046; C09J 2423/106; C09J 2467/006; B23K 26/382; B23K 26/0846; B26F 1/24; B65H 16/025; B65H 18/08; Y10T 428/14; Y10T 428/28

See application file for complete search history.

(56) References Cited

U.S. PATENT DOCUMENTS

| | | | | |
|---|---|---|---|---|
| 2,142,194 A | * | 1/1939 | Karfiol | F16B 47/003 |
| | | | | 206/447 |
| 3,085,024 A | * | 4/1963 | Blackford | C09J 7/20 |
| | | | | 428/43 |

(Continued)

FOREIGN PATENT DOCUMENTS

WO WO/2019/217179 11/2019

*Primary Examiner* — Patricia L. Nordmeyer
(74) *Attorney, Agent, or Firm* — Raymond Y. Chan; David and Raymond Patent Firm

(57) ABSTRACT

A stress tearable tape includes an elongated film and a hand tearing arrangement. The film has a non-adhesive surface and an opposed adhesive surface, and defines a longitudinal direction and a transverse direction. The hand tearing arrangement includes a plurality of pinholes formed along the longitudinal direction of the film. With the combination application of internal force, shear tension, compression tension, pinhole arrangement, and material's biaxial structure, and users' habit together, each of the pinholes enables the film being torn by hand with a force starting at one of the pinholes, such that the film is hand tearable at any section in the transverse direction thereof.

36 Claims, 24 Drawing Sheets

(56) References Cited

U.S. PATENT DOCUMENTS

| | | | | |
|---|---|---|---|---|
| 3,143,208 A | * | 8/1964 | Sizemore, Jr. | A61F 13/0269 428/43 |
| 3,706,626 A | * | 12/1972 | Smith et al. | G09F 3/10 428/42.3 |
| 3,794,554 A | * | 2/1974 | Caring | C09J 7/20 428/43 |
| 4,346,700 A | * | 8/1982 | Dunshee | A61L 15/24 128/849 |
| 4,465,729 A | * | 8/1984 | Cancio | B44C 1/10 156/209 |
| 5,496,605 A | * | 3/1996 | Augst | A61F 13/0273 428/43 |
| 5,795,637 A | * | 8/1998 | Wilson | B32B 3/04 174/135 |
| 6,238,762 B1 | * | 5/2001 | Friedland | B42D 15/008 428/43 |
| 7,138,169 B2 | * | 11/2006 | Shiota | B29D 7/01 428/134 |
| 8,101,884 B2 | * | 1/2012 | Kato | C09J 7/20 219/121.71 |
| 2003/0201314 A1 | | 10/2003 | Perenyi et al. | |
| 2004/0028867 A1 | | 2/2004 | Allison | |
| 2005/0084641 A1 | * | 4/2005 | Downs | B42D 5/002 428/42.3 |
| 2005/0255275 A1 | * | 11/2005 | Downs | B42F 5/00 428/42.3 |
| 2005/0262747 A1 | | 12/2005 | Ali et al. | |
| 2007/0009697 A1 | * | 1/2007 | Silva | B05B 12/24 428/40.1 |
| 2007/0014956 A1 | * | 1/2007 | McCarthy | B65H 18/28 428/40.1 |
| 2012/0045612 A1 | * | 2/2012 | Morioka | C09J 7/243 428/137 |
| 2012/0125986 A1 | * | 5/2012 | Walton | G09F 3/10 229/87.05 |
| 2012/0231167 A1 | | 9/2012 | Langeman | |
| 2015/0010700 A1 | | 1/2015 | Bartusiak et al. | |
| 2016/0237320 A1 | * | 8/2016 | Yamamoto | B65H 35/0026 |

* cited by examiner

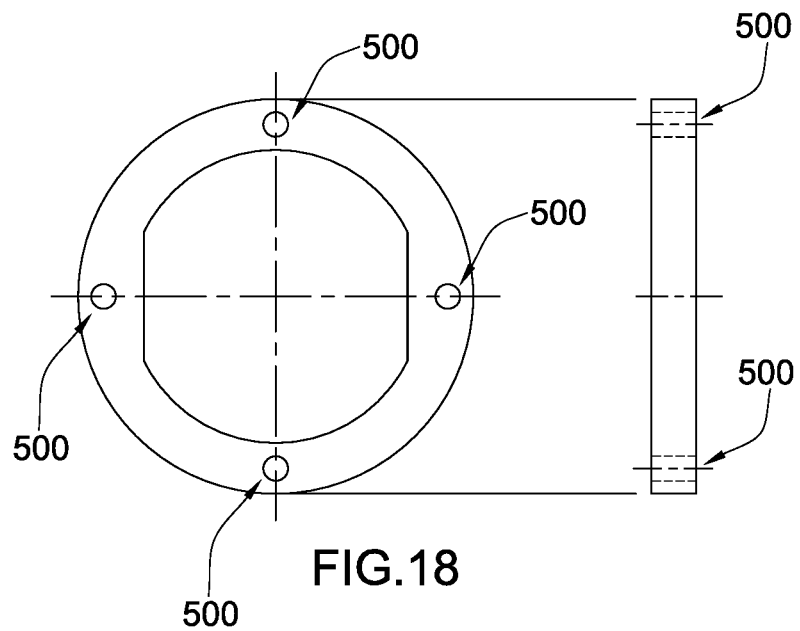
FIG.18
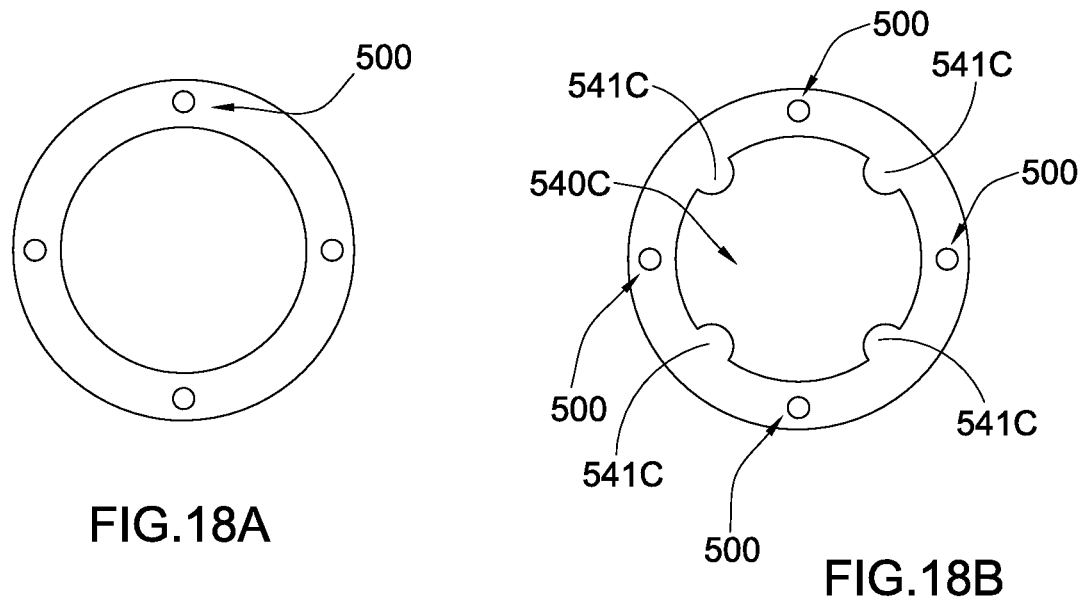
FIG.18A
FIG.18B

STRESS TEARABLE TAPE

CROSS REFERENCE OF RELATED APPLICATION

This is a non-provisional application that claims priority to U.S. provisional application No. 62/709,838, filed Feb. 1, 2018, the entire contents of which is expressly incorporated herein by reference.

NOTICE OF COPYRIGHT

A portion of the disclosure of this patent document, including specification and drawings, contains material which is subject to copyright protection. The copyright owner, i.e. the inventor, has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to an adhesive tape and any type of the plastic film coated with adhesive, and more particularly to a stress tearable tape which can be easily cut by user's hand in a transverse direction of the tape without affecting a tensile strength of the tape along a longitudinal direction thereof.

Description of Related Arts

A small tape roll is a plastic film roll assembly coated or not coated with an adhesive layer to form a self-adhesive small tape roll. The adhesive can be a water-based acrylic adhesive, water-activated gum tape, removable type adhesive, natural rubber adhesive, or synthetic rubber adhesive.

Generally speaking, there are two types of adhesive tape in the market. The first type of adhesive tape is made of plastic such as packaging tape, wherein the packaging tape has high tensile strength along its transverse and longitudinal directions. Having this high tensile ability, the packaging tape is strong enough to seal the boxes. However, the packaging tape is usually incorporated with a tape dispenser because it is hard for the user to tear the packaging tape by hand. Otherwise, a cutting tool, such as knife or scissors, should be carried by the user to cut the packaging tape. Another type of adhesive tape is made of paper as a paper tape, such as masking tape, Kraft paper tape, or painter tape. This paper tape can be easily cut by the user's hand because the paper tape has less tensile strength. In other words, the paper tape can be torn or cut off along its transverse and longitudinal directions. However, the paper tape is expensive than the packaging tape because of the material cost of the paper tape. In addition, the paper tape must be thicker than the packaging tape, in order to reach the same strength as the BOPP packaging tape, such that the paper tape is not an environment friendly product.

It is worth mentioning that the above mentioned two types of tape have the common drawback, wherein both the packaging tape and the paper tape cannot be torn or cut off exactly in the its transverse direction by the user's hand. On other words, the user must use any tool, such as the tape dispenser, the knife or the scissors, to exact cut the tape in the transverse direction thereof.

SUMMARY OF THE PRESENT INVENTION

The invention is advantageous in that it provides a stress tearable tape which can be easily cut by user's hand in a transverse direction of the tape without affecting a tensile strength of the tape along a longitudinal direction thereof.

Another advantage of the invention is to provide a stress tearable tape, which is made of bi-axially oriented polypropylene (BOPP) material to enhance the tensile strength of the tape along a longitudinal direction thereof.

Another advantage of the invention is to provide a stress tearable tape, which is stronger and thinner than the paper tape and is easier being torn than the packaging tape.

Another advantage of the invention is to provide a manufacturing method for a stress tearable tape, which can simply incorporate with the conventionally tape manufacturing method to add the hand tearing arrangement on the tape.

Another advantage of the invention is to provide a stress tearable tape, which can replace the conventional Masking tape, Painter tape or Kraft paper tape to minimize the cost of the tape and to ensure the tape being cut or torn easily in a transverse direction thereof.

Another advantage of the invention is to provide a stress tearable tape, which is approximately 50% less weight than the paper type tape, such as masking tape, and is approximately 60% less weight than the conventional blue painter tape and water-activated reinforced gum tape.

Another advantage of the invention is to provide a stress tearable tape, which is made of printable material that a reference line and/or scale markers can be printed on the tape to provide additional functions.

Another advantage of the invention is to provide a stress tearable tape, which has at least a slit edge to ensure the tape being easily cut by user's hand in a transverse direction and to create a tamper evident effect after the tape is used.

Another advantage of the invention is to provide a stress tearable tape and a manufacturing method thereof, which does not require altering the original structural design of the tape, so as to minimize the manufacturing cost of the tape that incorporates the hand tearing arrangement.

Another advantage of the invention is to provide a stress tearable tape and a manufacturing method thereof, wherein no expensive or complicated structure is required to employ the present invention in order to achieve the above mentioned objectives. Therefore, the present invention successfully provides an economic and efficient solution for ensuring the tape being easily cut by user's hand in a transverse direction without affecting a tensile strength of the tape along a longitudinal direction thereof.

Additional advantages and features of the invention will become apparent from the description which follows, and may be realized by means of the instrumentalities and combinations particular point out in the appended claims.

According to the present invention, the foregoing and other objects and advantages are attained by a stress tearable tape which comprises an elongated film and a hand tearing arrangement.

The film has a non-adhesive surface and an opposed adhesive surface, and defines a longitudinal direction and a transverse direction. The hand tearing arrangement comprises a plurality of pinholes formed along the longitudinal direction of the film, wherein each of the pinholes enables the film being torn by hand with a force starting at one of the pinholes, such that the film is hand tearable in the transverse direction thereof.

In accordance with another aspect of the invention, the present invention comprises a method for manufacturing a stress tearable tape which comprises the following steps.

(A) Form an elongated film to have a non-adhesive surface and an opposed adhesive surface.

(B) Form a plurality of pinholes along a longitudinal direction of the film, wherein each of the pinholes enables the film being torn by hand with a force starting at one of the pinholes, such that the film is hand tearable in a transverse direction thereof.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

FIG. 18 illustrates the puncture rotary die blade holder of the machine according to the above preferred embodiment of the present invention.

FIGS. 18A and 18B illustrate alternative modes of the puncture rotary die blade holder of the machine according to the above preferred embodiment of the present invention.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 1:
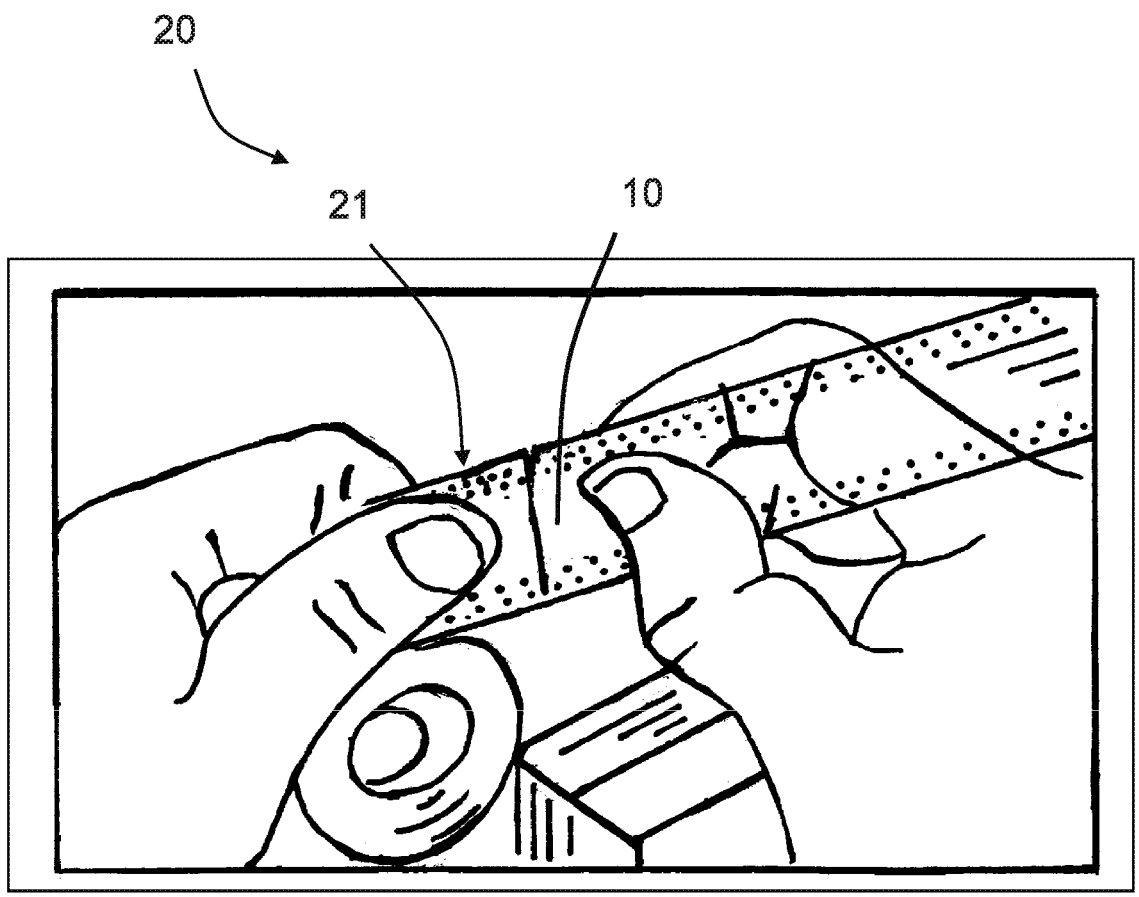
FIG. 1 is a perspective view of a stress tearable tape according to a preferred embodiment of the present invention, illustrating the tape being hand tearable in the transverse direction thereof.
Figure 2:
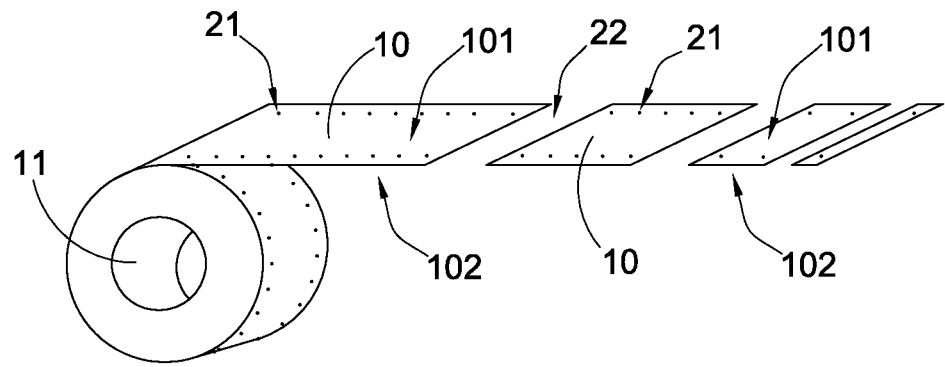
FIG. 2 is a perspective view of the stress tearable tape according to the above preferred embodiment of the present invention, illustrating the tape capable of being torn and cut into different length-sections.

Referring to FIGS. 1 and 2 of the drawings, a stress tearable tape according to a preferred embodiment of the present invention is illustrated, wherein the stress tearable tape comprises an elongated film 10 and a hand tearing arrangement 20.

The film 10 has a non-adhesive surface 101 and an opposed adhesive surface 102, and defines a longitudinal direction and a transverse direction. The hand tearing arrangement 20 comprises a plurality of pinholes 21 formed along the longitudinal direction of the film 10, wherein each of the pinholes 21 enables the film 10 being torn by hand with a force starting at one of the pinholes 21, such that the film 10 is hand tearable in the transverse direction thereof. Without the hand tearing arrangement 20, people will not be able to tear the tape by hand.

Accordingly, the stress tearable tape is an assembly made up of a "small tape roll" integrally wound on the tape core. The film 10 is a plastic film roll assembly made from a material such as bi-axially-oriented polypropylene (BOPP) and either coated or not coated with an adhesive layer to form a self-adhesive small tape roll. The adhesive can be a water-based acrylic adhesive, natural rubber adhesive, or synthetic rubber adhesive. Accordingly, the film 10 is preferably made of BOPP to enhance the tensile strength of the tape along a longitudinal direction thereof. Preferably, the film 10 is a transparent film. In addition, the adhesive can be the removable adhesive or the permanent adhesive, wherein the removable adhesive can be removed from the surface after being adhered thereon, and the permanent adhesive is permanently adhered on the surface.

Figure 3A:
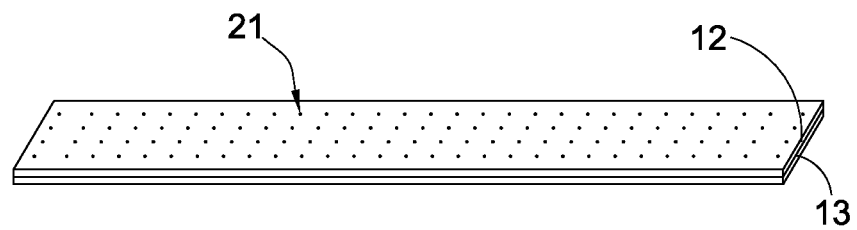
FIGS. 3A to 3C illustrate different structures of the film of the stress tearable tape according to the preferred embodiment of the present invention.
Figure 3B:
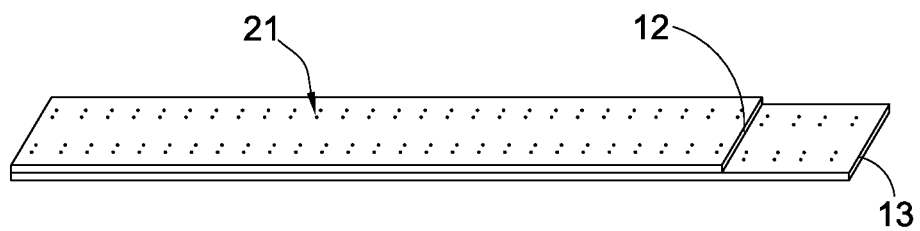
Figure 3C:
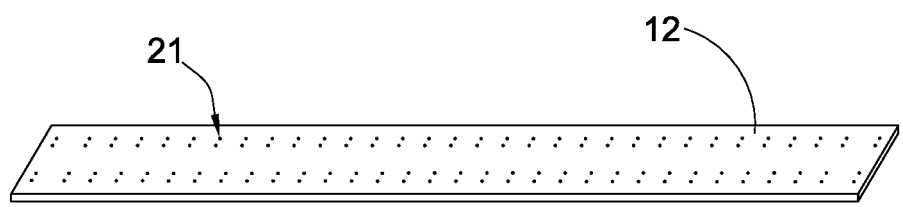

The film 10 comprises a film member 12 and an adhesive layer 13 overlapped underneath to define the non-adhesive surface 101 at the film member 12 and the adhesive surface 102 at the adhesive layer 13. The adhesive layer 13 can be coated at the film member 12 as shown in FIG. 3A. Alternatively, the adhesive layer 13 can be attached at the film member 12 as shown in FIG. 3B. Or, the film 10 can only have the film member 12 without the adhesive layer 13, as shown in FIG. 3C.

The film 10 is created and designed with two longitudinal edge portions, i.e. an upper tape edge and lower tape edge, wherein the pinholes 21 are formed therealong. Preferably, the film 10 is wound around a tape core 11. The hand tearing arrangement 20 further comprises a pinhole bridging 22 that connects and bridges the pinholes 21 together. The film 10 can be applied with a right pulling force and/or left pulling force, to create internal tension and form stress concentration on the pinholes 21. The pinholes 21 not only receive the stress concentration from internal tension, but they can also receive shearing tension created by tearing upward or downward, with left hand fingers and right hand fingers adding shearing tension and shearing stress on the pinholes 21.

Figure 4A:
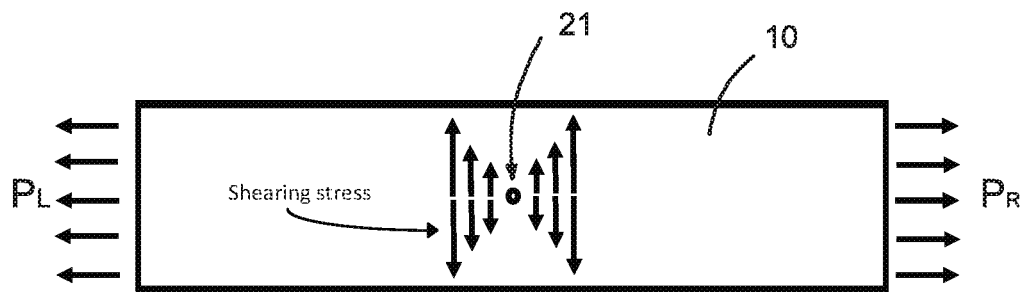
FIGS. 4A to 4C illustrate shearing stress and tension stress direction on pinhole perpendicular to the tension of $P_L$ and $P_R$ direction on the film with the pinhole at the centerline of the film according to the preferred embodiment of the present invention.
Figure 4B:
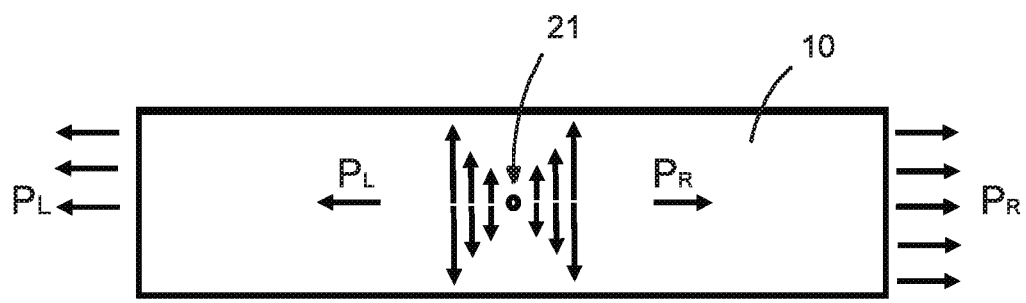
Figure 4C:
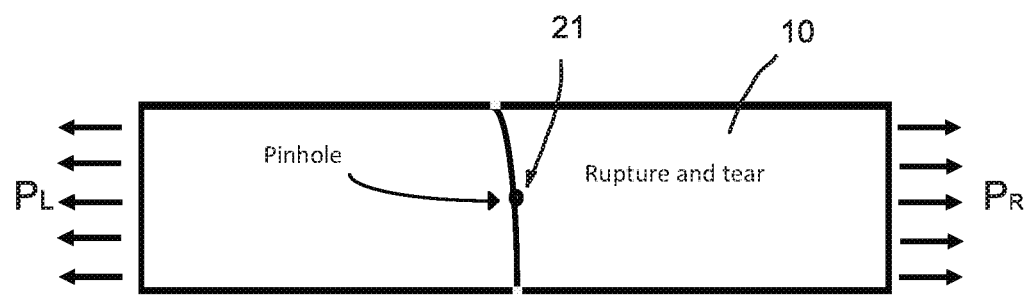
Figure 5A:
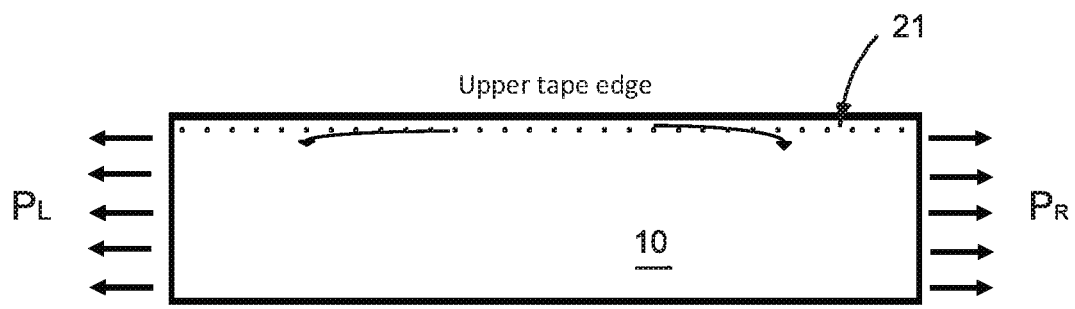
FIGS. 5A to 5C illustrate shearing stress on the film and tension stress direction perpendicular to tension $P_L$ and $P_R$ with the pinhole at the longitudinal edge portion of the film according to the preferred embodiment of the present invention.
Figure 5B:
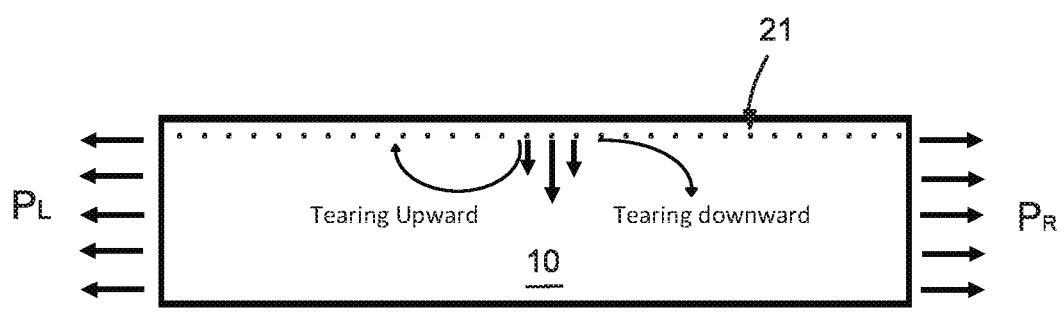
Figure 5C:
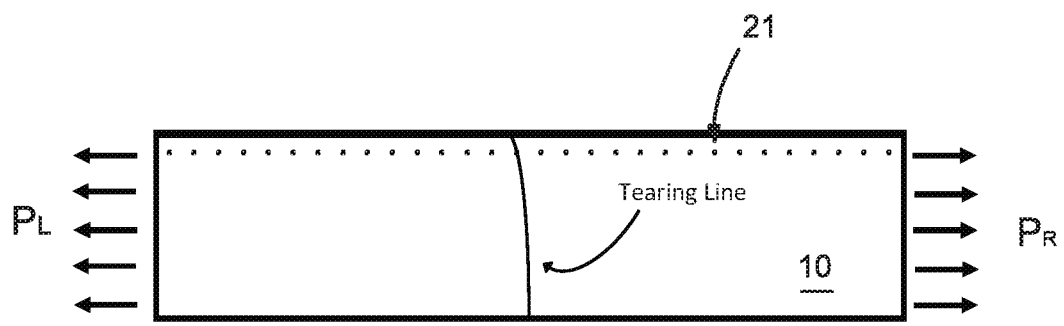
Figure 7A:
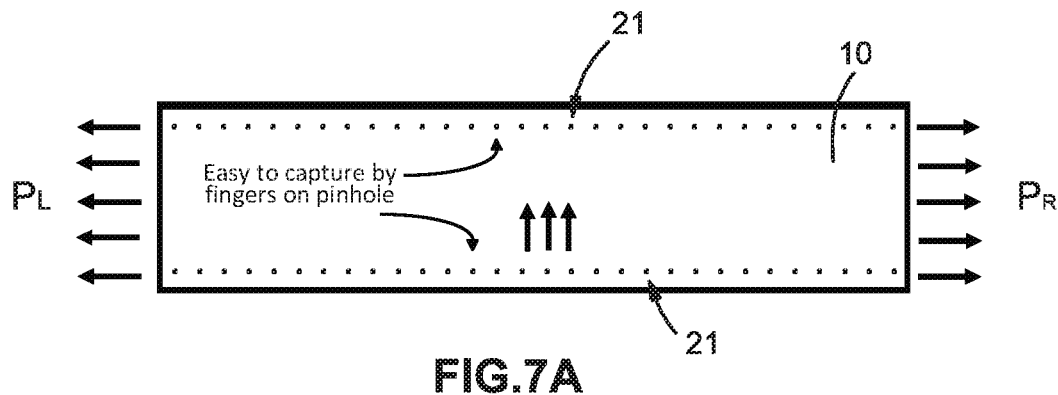
FIGS. 7A to 7C illustrate shearing stress and tension stress direction perpendicular to tension $P_L$ and $P_R$ on the film with the pinhole at two longitudinal edge portions of the film according to the preferred embodiment of the present invention.
Figure 7B:
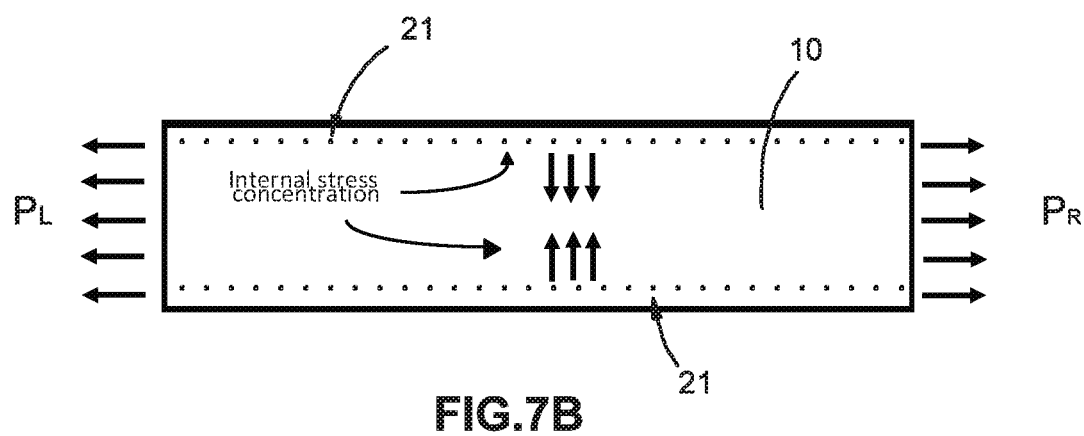
Figure 7C:
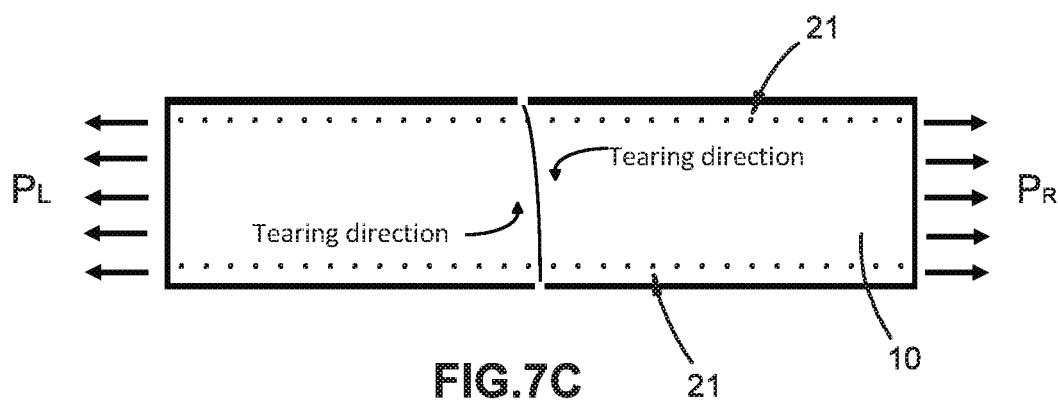

As shown in FIGS. 1 and 2, the pinholes 21 are formed at the film 10 along the longitudinal direction thereof. The pinholes 21 are aligned with each other to lineup along a centerline of the film 10 along the longitudinal direction thereof, as shown in FIGS. 4A-4C. Alternatively, the pinholes 21 are aligned with each other and are formed at the film 10 along at least one of the longitudinal edge portions of the film 10, as shown in FIGS. 5A-5C. Preferably, the pinholes 21 are aligned with each other and are formed in pair that each two of the pinholes 21 in pair are form at the longitudinal edge portions of the film 10 respectively, as shown in FIGS. 7A-7C.

It is worth mentioning that the pinholes 21 are very closely spaced apart and aligned to form a pinhole row along the at least one of the longitudinal edge portions of the film 10, wherein the pinholes 21 are located close to each other, such that pinholes 21 form a dotted line along the longitudinal edge portion of the film 10. Every two of the pinholes 21 are close to each other but not touch with each other. The dotted line forms a tearing reference line to notify the user which edge of the film 10 to be firstly torn. When two pinhole rows are formed, two dotted lines are extended along the longitudinal edge portions of the film 10 to notify the user either edge of the film 10 to be firstly torn. It is worth mentioning that the pinholes 21 are close to each other but not connect with each other.

Preferably, a distance between each pinhole 21 along the longitudinal edge portion of the film 10 and the corresponding edge thereof is the same. According to the preferred embodiment, a barrier portion 210 is defined between the pinhole 21 and the edge of the film 10, wherein the barrier portion 210 protects the film 10 being torn accidentally from the pinhole 21. The width of the barrier portion 210, i.e. the distance between the pinhole 21 and the corresponding edge of the film 10, should be minimized, such as 0.005", while the pinhole 21 near tangentially touches the edge of the film 10.

The hand tearing arrangement 20 is configured that (i) a diameter of each of the pinholes 21 is smaller than a distance between two adjacent pinholes 21, and (ii) a distance between the pinhole 21 and the closest edge of the film 10 is smaller than a distance between two adjacent pinholes 21.

Figure 2A:
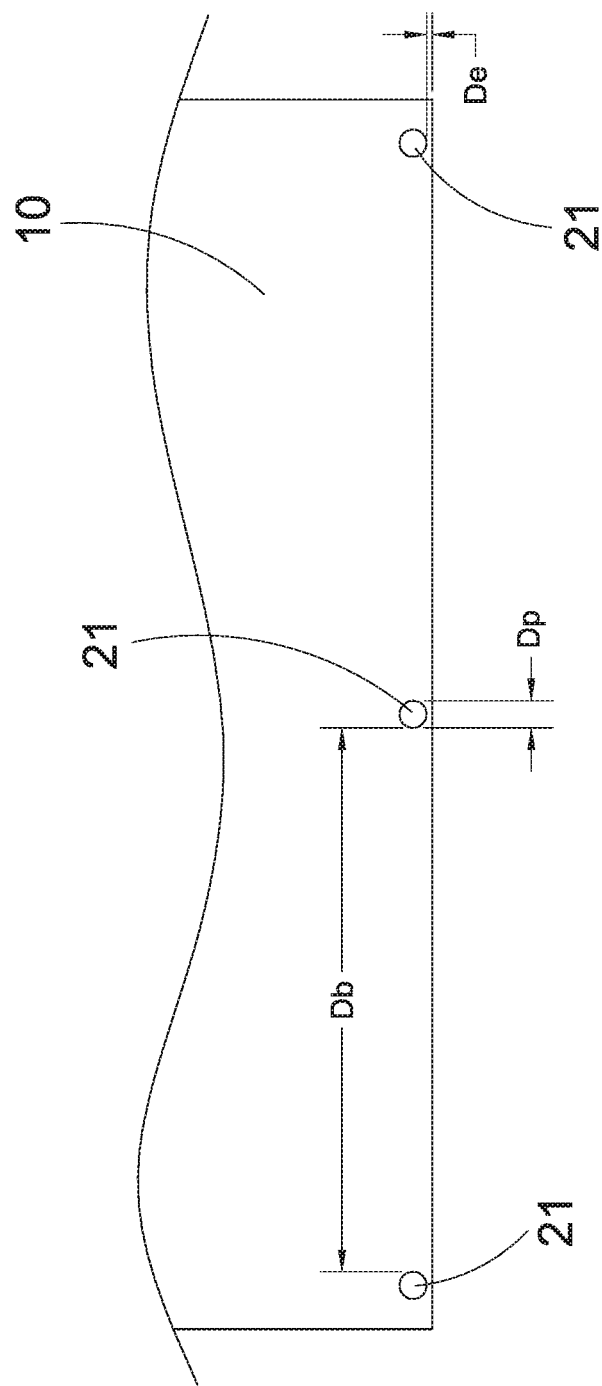
FIG. 2A illustrates the pinhole configuration of the stress tearable tape according to the above preferred embodiment of the present invention.
Figure 8:
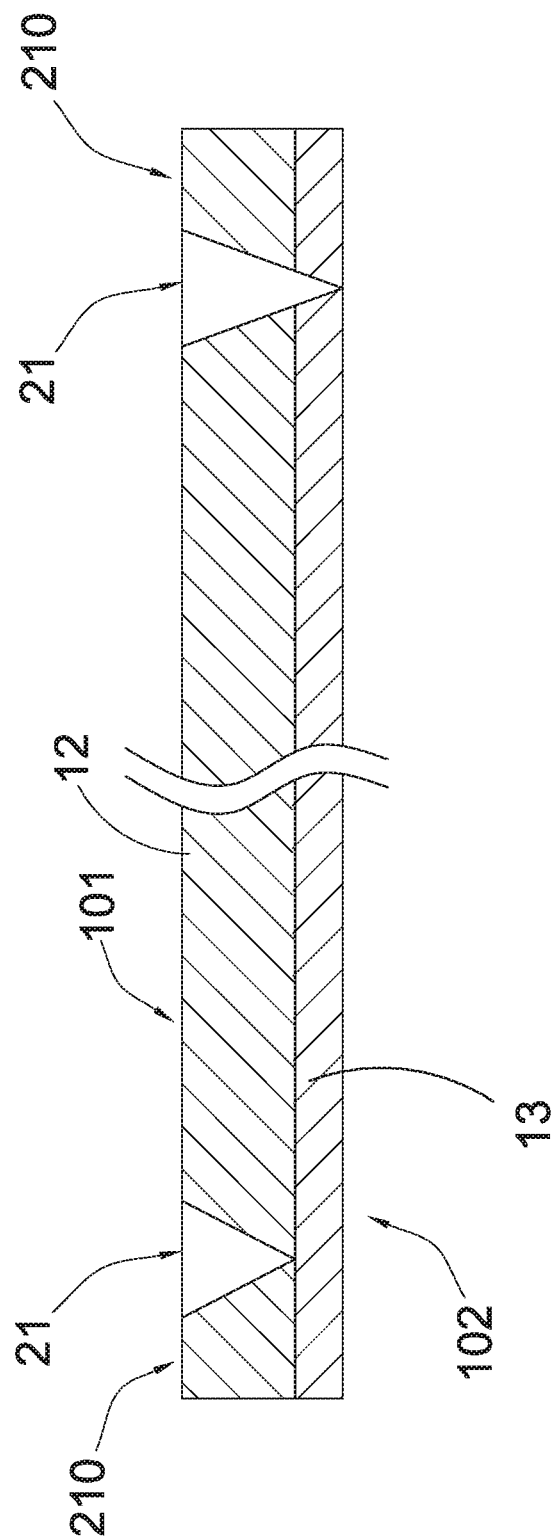
FIG. 8 is a sectional view of the stress tearable tape according to the above preferred embodiment of the present invention, illustrating the configuration of the pinhole as not a through hole or a through hole on the film.

As shown in FIG. 2A, the diameter Dp of each pinhole 21 is about 0.001-0.10 inch, preferably 0.005-0.012 inch. The pinhole 21 must be big enough for visible purpose and must be small enough for preventing the damage of the film 10, such as the strength thereof. A distance Db between each two of pinholes 21 is about 0.05-0.2 inch, preferably, 0.1-0.125 inch. The pinhole density is defined by the distance Db between each two of pinholes 21 along the row thereof. The pinhole 21 should be located close enough to the adjacent pinhole 21 to increase the pinhole density and should not be connected to the adjacent pinhole 21 to damage the film 10. The pinhole density is increased by minimizing the distance Db between each two of pinholes 21 to allow the finger tip of the user to catch the pinhole 21. Preferably, the pinhole density of the pinhole 21 is increased for allowing the finger tip of the user to cover at least two pinholes 21 along the longitudinal direction at any section of the film 10. A distance De between the edge of the film 10 and the pinhole 21 is about 0.01-0.2 inch, preferably 0.03-0.4 inch. The pinhole 21 should be located enough to the edge of the film 10 to allow the user to initially tear the film 10. A thickness of the film 10 is about 0.001-0.003 inch, preferably 0.002 inch. Preferably, each of the pinholes 21 is not a through hole that the pinhole is not penetrated from the non-adhesive surface 101 of the film 10 to the adhesive surface 102 thereof, as shown in FIG. 8. Likewise, each of the pinholes 21 is a through hole that the pinhole is penetrated from the non-adhesive surface 101 of the film 10 to the adhesive surface 102 thereof, as shown in FIG. 8.

Figure 2B:
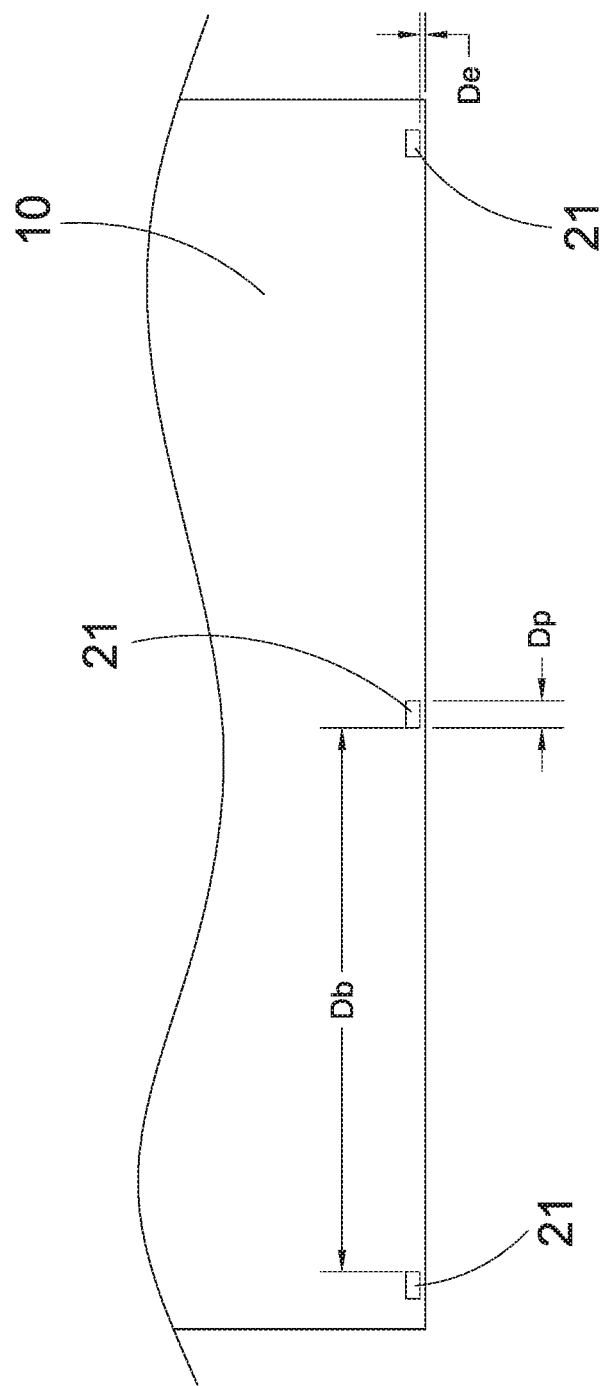
FIG. 2B illustrates an alternative mode of the pinhole of the stress tearable tape according to the above preferred embodiment of the present invention.

Accordingly, a diameter size of the pinhole 21 at the non-adhesive surface 101 of the film 10 is about 0.005 inch and the diameter size of the pinhole 21 is gradually reduced toward the adhesive surface 102 of the film 10. In other words, the pinhole 21 has a conical shape. Alternatively, each of the pinholes 21 can be configured to have a rectangular shape, as shown in FIG. 2B, wherein the diameter Dp of each pinhole 21 is defined as the width thereof, the distance Db between each two of pinholes 21 is defined as a distance between two transverse edges of the pinholes 21, and the distance De between the edge of the film 10 and the pinhole 21 is defined as the distance between the edge of the film 10 and the longitudinal edge of the pinhole 21. It is worth mentioning that each of the pinholes 21 can be configured to have an irregular shape, circular shape, star shape.

In order to form the non-through hole configuration, the pinholes 21 can be formed on the film member 12 before the adhesive layer 13 is overlapped underneath the film member 12. Therefore, each of the pinholes 21 penetrates through the film member 12 only but not through the adhesive layer 13. Likewise, in order to form the through hole configuration, the pinholes 21 can be formed on the film member 12 after the adhesive layer 13 is overlapped underneath the film member 12. In other words, each of the pinholes 21 penetrates through both the film member 12 and the adhesive layer 13.

As shown in FIGS. 4A-4C, the pinhole 21 is formed at the centerline of the film 10. The pulling forces, i.e. the leftward pulling force $P_L$ and the rightward pulling force PR, are applied at the film 10 along the longitudinal direction thereof. Surrounding material of the film 10 at the pinhole 21 will continue as a barrier to protect the pinhole 21 and support the stress transfer until shearing stress reach the rupture point on the pinhole 21, as shown in FIG. 4A. Stress concentration on the pinhole 21 to create sheering stress perpendicular to the leftward pulling force $P_L$ and the rightward pulling force $P_R$, as shown in FIG. 4B. Rupture and tear perpendicular to the tape edges as shown in FIG. 4C.

As shown in FIGS. 5A-5C, the pinholes 21 are formed at one longitudinal portion of the film 10. The pulling forces, i.e. the leftward pulling force $P_L$ and the rightward pulling force $P_R$, are applied at the film 10 along the longitudinal direction thereof. In particular, the pinholes 21 are lined up to form the dotted tearing reference line on the longitudinal portion of the film 10 so as to indicate the tearing starting point, as shown in FIG. 5A. Stress concentration on the pinholes 21 form the rightward pulling force $P_L$ and the rightward pulling force $P_R$, and shearing stress from tearing upward and tearing downward on the pinholes 21, as shown in FIG. 5B. It is worth mentioning that the pinholes 21 are formed as a single row pinhole, wherein rupture and tear to form a rather straight tearing line, as shown in FIG. 5C.

Figure 6A:
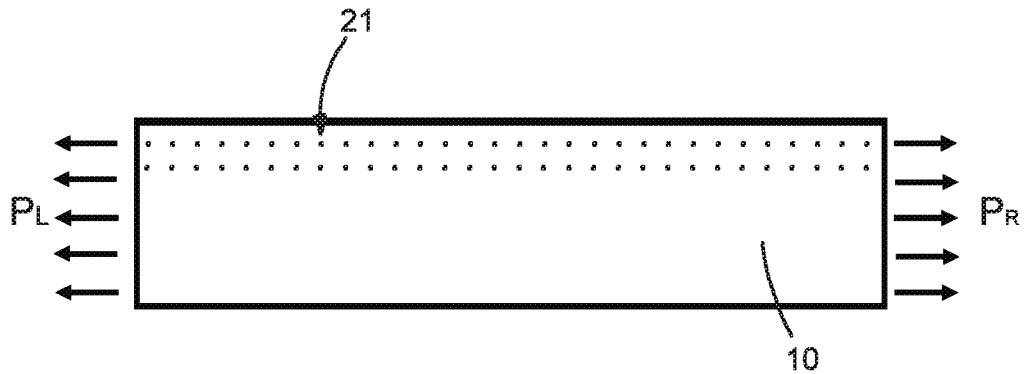
FIGS. 6A to 6C illustrate two rows of pinholes, three rows of pinholes, and multiple rows of pinholes on the film respectively according to the preferred embodiment of the present invention.
Figure 6B:
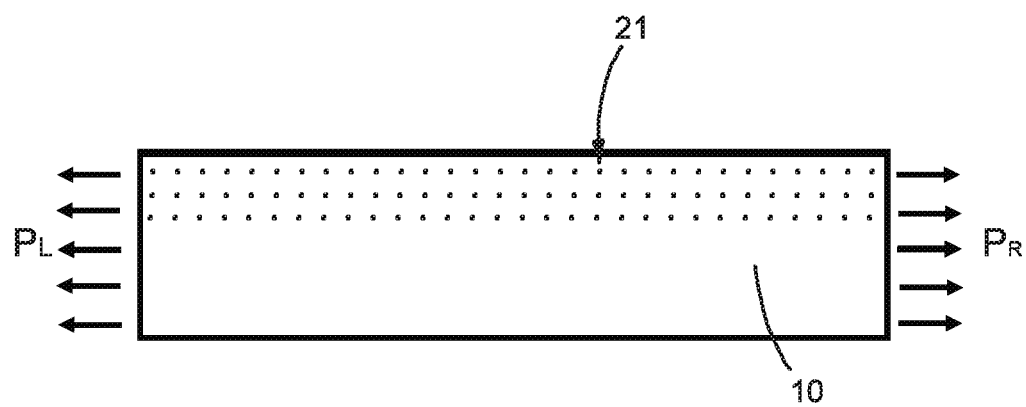
Figure 6C:
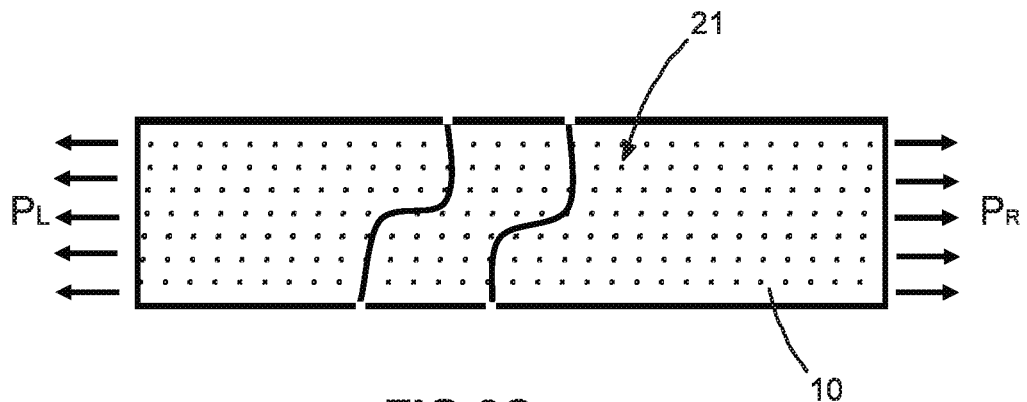

As shown in FIG. 6A, the pinholes 21 are formed at one longitudinal portion of the film 10, wherein the pinholes 21 form double row pinholes to increase pinhole density and to easy capture by user's fingers. As shown in FIG. 6B, the pinholes 21 are formed at one longitudinal portion of the film 10, wherein the pinholes 21 form triple row pinholes to increase pinhole distribution area and pinhole coverage area with pinhole bridging 22 and for good opportunity to tear. As shown in FIG. 6C, the pinholes 21 are evenly formed at the film 10, wherein multiple rows of pinholes 21 connect by pinhole bridging 22 and form the tamper evident effect function. It is worth mentioning that the pinholes 21 can be unevenly formed at the film 10.

As shown in FIGS. 7A-7C, the pinholes 21 are formed at two longitudinal portions of the film 10, wherein the pinholes 21 form a single row pinhole along each of the longitudinal portions of the film 10, such that the film 10 is easy to capture by fingers on pinholes 21. Since the pinholes 21 are formed at two longitudinal portions of the film 10, it is option to tear on either edge of the film 10. Accordingly, internal stress concentration on each pinhole 21 to the film 10 so as to form a symmetrical breaking line, as shown in FIG. 7C. The tearing direction at the film 10 is that tear and rupture start at the corresponding pinhole 21, following the orientation of the material structure, to either edge of the film 10.

The film 10 can be also created and designed to have good pinhole coverage and distribution area. By adding a single, double row, and/or triple row of pinholes 21 on the longitudinal edge portions of the film 10. The film 10 can also be designed with a shorter pinhole bridging distance, i.e. a distance between each two of the pinholes 21 in pair, to increase pinhole density for stress concentration. The pinhole density is increased in order for finger of the user to catch the pinhole easily.

The stress tearable tape of the present invention can be designed to increase pinhole density and pinhole coverage by shortening the pinhole bridging 22 and adding multiple rows of pinholes 21 to make it rupture very easily after taping on the product, and when peeling to become tamper evident.

Accordingly, the pinhole bridging 22 is designed to bring the distance close enough to provide good coverage for the left hand fingers and right hand fingers, allowing application of not only rightward pulling force and leftward pulling force, but also upward shearing tension and downward shearing tension.

The film 10 is created and designed to combine with the hand tearing arrangement 20, its function subject to the stress concentration of the internal stress, which includes internal tension along the longitude of the BOPP film of the small tape roll, with shearing stress and torsion stress on the pinhole 21, and also on the cross section of the BOPP film, as well as a combination of all internal stresses above. The pinhole 21 is designed to proof the internal stress concentration distribution on the pinhole 21. The stress on the pinhole point is perpendicular to the external pulling tension direction user's intention, orientation of material structure, and the rupture will break on the cross section, across the film 10. It is also created and designed with material strength (supporting the pinhole bridging 22) being much greater than the strength required to peel the film 10 out of the tape core. The bridging 22 provides sufficient material supporting strength to avoid rupture when peeling the film 10 out from the small tape roll.

The film 10 is also created and designed with pinholes 21 (punctured by the puncture rotary die) which support a rather straight tearing line across the width section. Because the user's intended tearing direction will match and meet the rupture direction of material that caused by the stress concentration on the pinholes 21, it will create a rather preferred straight tearing line (also due to the use of bi-axially-oriented polypropylene material).

The small tape roll can be printed with a reference line of continuous scales, as means for a guideline, for the workers to know where to adhere the tape on drywall or any type of painting surface. A continuous ruler printed repeatedly on the small tape roll functions as a means of non-moving measurement and as a means of identifying the tearing point of the film 10.

Figure 9:
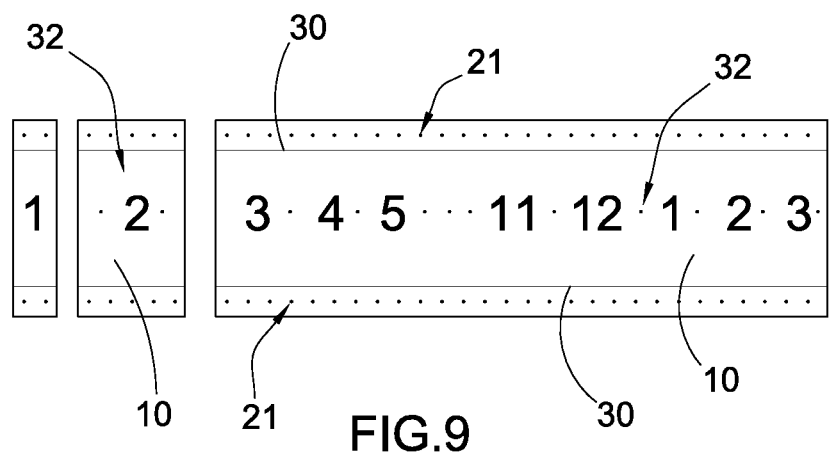
FIG. 9 is a top view of the stress tearable tape according to the above preferred embodiment of the present invention, illustrating the pinholes, the reference line, the scale markers on the film.
Figure 10:
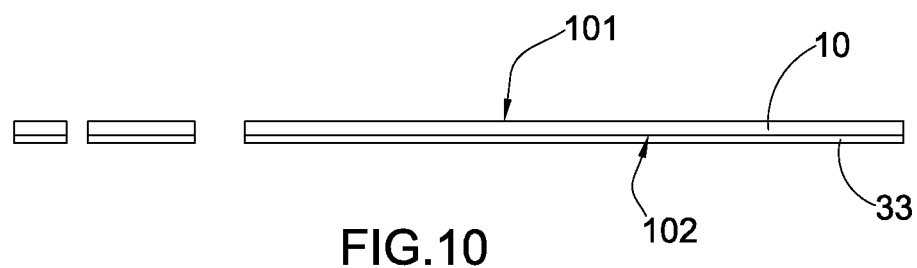
FIG. 10 is a side view of the stress tearable tape according to the above preferred embodiment of the present invention, illustrating the protective film overlapped underneath the adhesive layer of the film.
Figure 11:
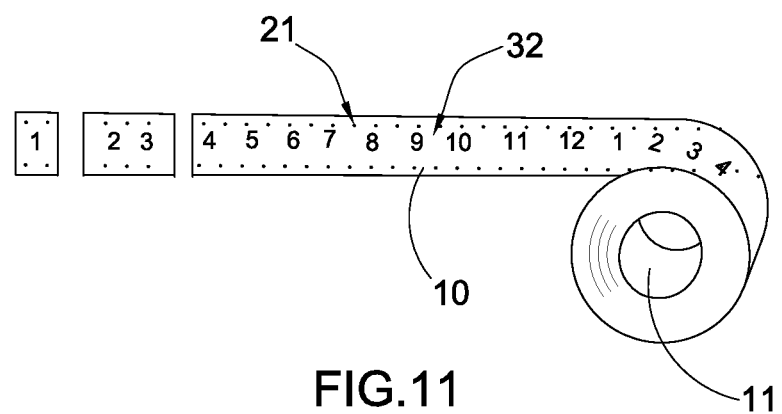
FIG. 11 illustrates only the pinholes and the scale markers on the film with the reference line according to the above preferred embodiment of the present invention.

According to the preferred embodiment, the tape of the present invention further comprises at least one reference line 30 printed at film along the longitudinal direction thereof. Preferably, the reference line 30 is formed along each of the longitudinal edge portions of the film 10 at a position that the lineup pinholes 21 are located between the reference line 30 and the edge of the film 10. Preferably, the pinholes 21 are aligned closely to form a row configuration so as to form a visible reference line 30. In addition, the tape further comprises a plurality of ruler scale markers 32 spacedly printed at the film 10 along the longitudinal direction thereof, wherein each of the ruler scale markers 32 is correspondingly formed between each two of the pinholes 21 in pair, as shown in FIG. 9. A protective film 33 is provided to removably overlapped on the adhesive surface 102 of the film 10 so as to protect the adhesive surface 102 of the film 10, as shown in FIG. 10. The film 10 can be used once the protective film 33 is removed from the adhesive surface 102 of the film 10. It is worth mentioning that the protective film 33 can be wound with the film 10 to form the tape roll or the film 10 itself can be wound to form the tape roll without the protective film 33. Alternatively, only the ruler scale markers 32 are provided on the film 10 along the longitudinal direction thereof without the reference line 30 as shown in FIG. 11.

The small tape roll should made very thin and soft when functioning as a painter's tape, to adhere softly on the panting surface and to avoid paint bleeding and to allow a sharper paint line and tearing at any section as needed.

It is worth mentioning that bi-axially oriented polypropylene (BOPP) material made film 10 with the hand tearing arrangement 20 can become a new type of painter's tape (replacing paper-type masking tape) producing sharper paint lines. Printed BOPP adhesive tape can function as a non-moving adhesive tape self hanging ruler.

In other words, the plastic film, such as the BOPP type material made tape or PET type tape, with permanent adhesive or removable adhesive, of the present invention is able to replace the paper type's material tape such as painters tape with the following advantages:

1. It is stronger than paper tape type's materials tape and it is thinner and softer but stronger.

2. Thinner and softer to adhere and to prevent paint bleed and a sharper paint line, the paint line is sharper than the thicker paper type tape material painters tape.

3. Tear at any section needed due to hand tearing arrangement.

4. Painted Scale, i.e. the reference line 30 and/or scale markers 32, on film roll for non-moving measurement reference and self adhesive wall mount measurement.

5. Painted reference line 30 to guide the painter to adhere the tape to the wall, floor, metal surface, automobile, air plane, furniture, etc. along the upper tape edge or lower tape edge to achieve a better quality painting work.

6. It is much more inexpensive than the paper type's material painter tape, masking tape, water-activated reinforced gum tape, Kraft paper tape. It also can be manufactured easily.

7. Thinner material as an environment saver. As the film 10 configured with the hand tearing arrangement 20, it is 50% approximately less weight than the paper type's material painters tape or masking tape. 60% approximately less weight than the "blue tape" and Kraft paper moving tape.

8. With respect to the tape width of the film 10, the hand tearing arrangement 20 can be tearing as easy as the paper type material masking tape and tearing easily at any section.

Figure 12:
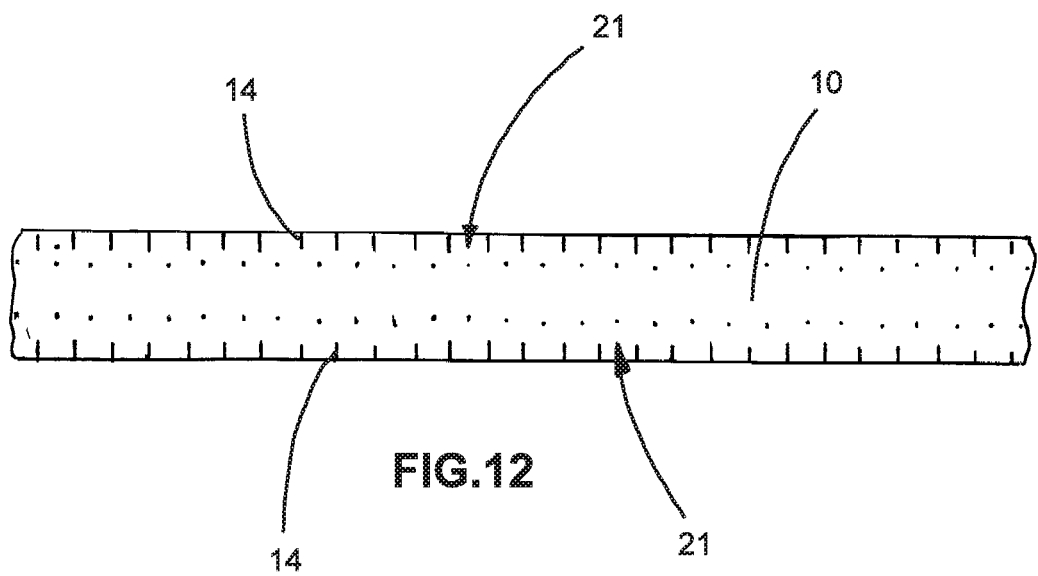
FIG. 12 illustrates the edge slit of the film according to the above preferred embodiment of the present invention.

As shown in FIG. 12, the film 10 further comprises a plurality of edge slits 14 continuously and spacedly formed along at least one edge of the film 10 to form a slit edge, wherein the edge slits 14 are misaligned with the pinholes 21 at the transverse direction of the film 10. It is worth mentioning that one or more of the reference line 30, the ruler scale markers 32, the protective film 33, and the edge slits 14 are selectively formed at the film 10 along the longitudinal direction thereof. In other words, depending on the width of the film 10, more than two or more of the reference line 30, the ruler scale markers 32, the protective film 33, and the edge slits 14 are selectively formed at the film 10. It is worth mentioning that the edge slits 14 can be aligned with the pinholes 21 at the transverse direction of the film 10.

Figure 13:
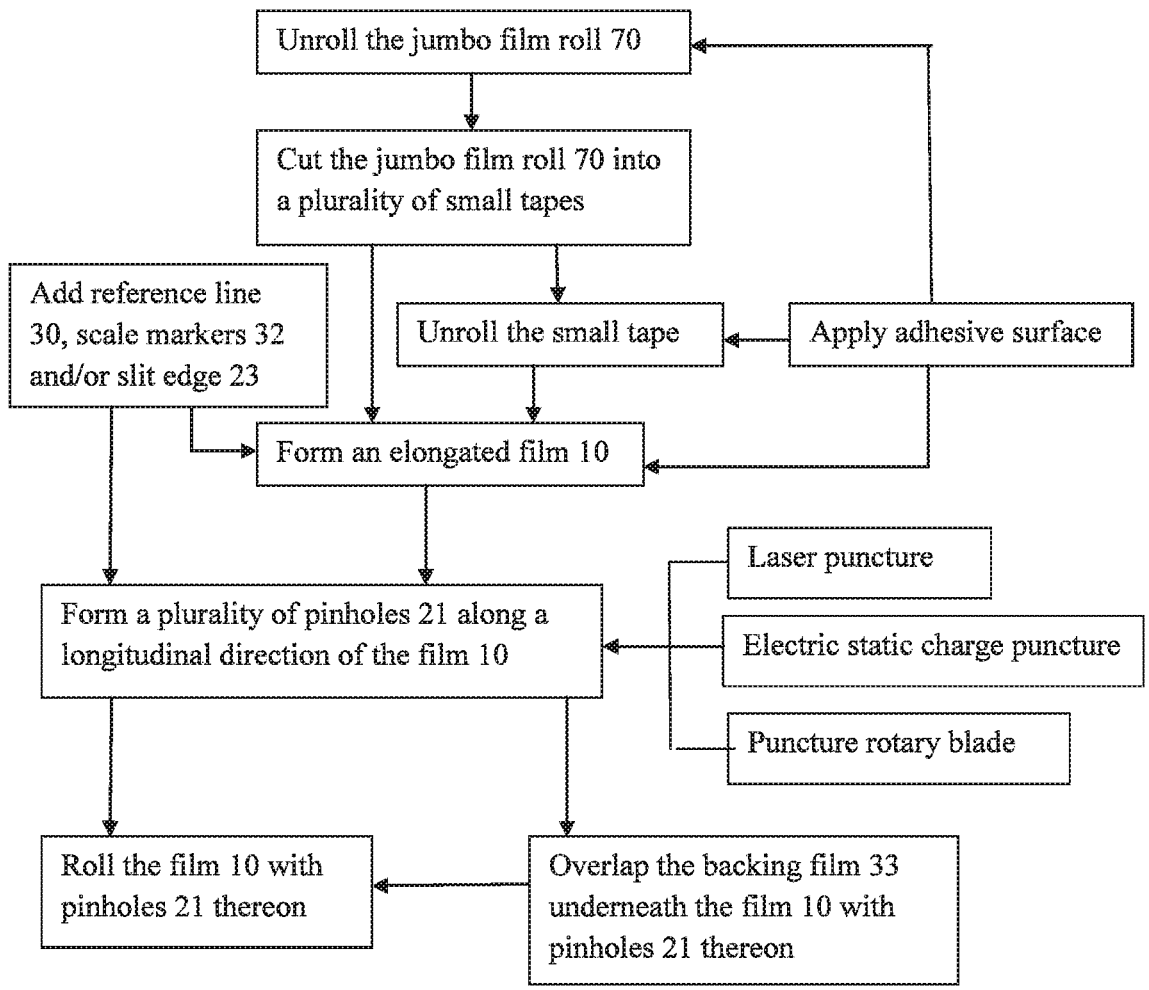
FIG. 13 is a block diagram illustrating a method of manufacturing the stress tearable tape according to the above preferred embodiment of the present invention.

As shown in FIG. 13, the present invention further comprises a method for manufacturing the stress tearable tape which comprises the following steps.

(1) Form the film 10 to have the non-adhesive surface 101 and the adhesive surface 102.

(2) Form a plurality of pinholes 21 along a longitudinal direction of the film 10. Preferably, in the step (2), the pinholes 21 are formed in pair that each two of the pinholes 21 in pair are formed at the longitudinal edge portions of the film 10 thereof.

According to the preferred embodiment, the method, before the step (1), further comprising the steps of forming a jumbo film roll 70 which has an adhesive coated underneath, and unrolling the jumbo film and cutting the jumbo film via a film cutter at the same time to form the film 10.

In particular, the stress tearable tape is an assembly designed and made up of a small tape roll, a means for easy carrying, and easy hand tearing when sealing boxes. The small tape roll is converted from film material to produce the jumbo film roll 70, then converted to a jumbo film adhesive-coated roll for slitting and puncturing by a puncture rotary die, and wound on the tape core 11 as means for easy carrying, and easy hand tearing.

The small roll is preferably created and designed from thin plastic film, starting as the jumbo film roll 70, punctured by a puncture rotary die and coated to become a jumbo adhesive-coated film roll. The rotary puncture also can puncture the small tape roll directly, or can also directly puncture the jumbo adhesive coated film roll, which is then slit and rewound into small tape rolls.

Figure 14:
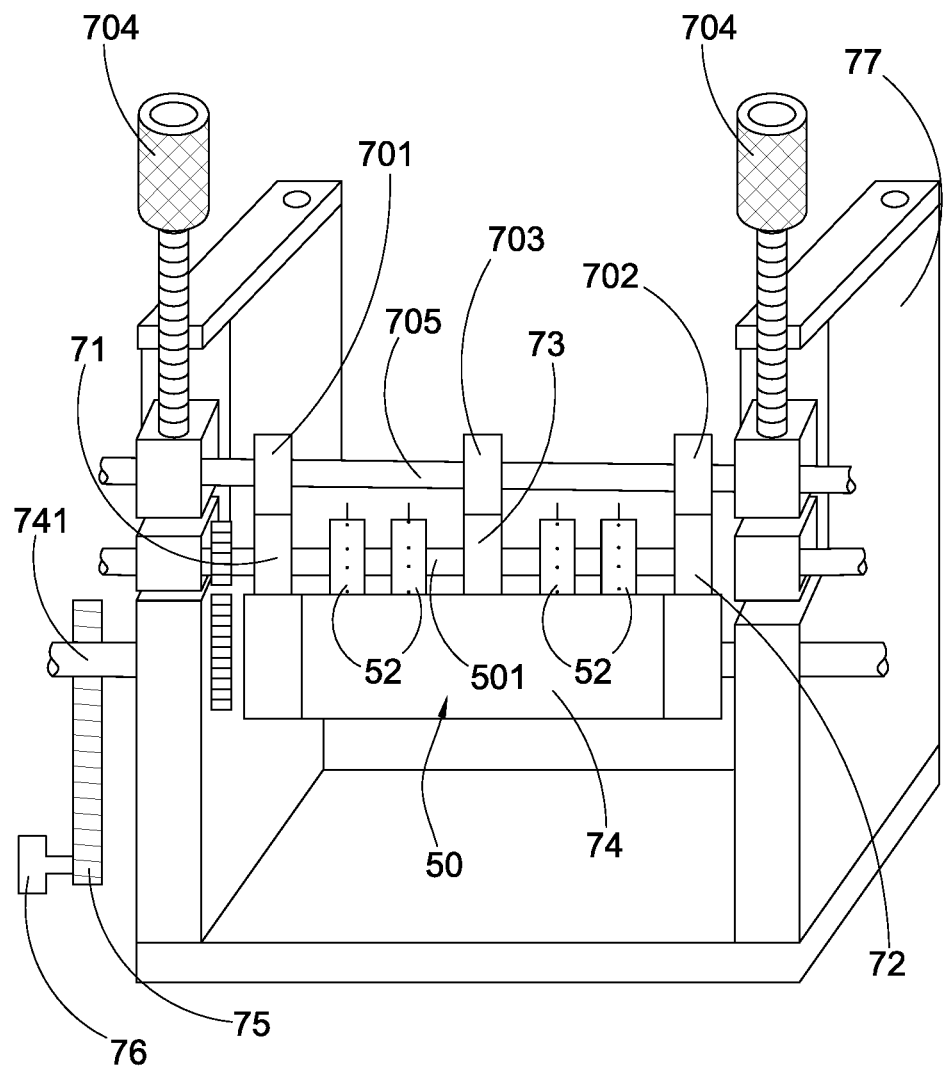
FIG. 14 illustrates a machine for manufacturing the stress tearable tape according to the above preferred embodiment of the present invention.

Pinholes 21 are generated by the puncture rotary die assembly 50, as shown in FIG. 14, with means of piercing with the needle size punctures, and means of piercing needle size holes to receive a means of internal stress concentration by the right side pulling force and left side pulling force, and also by shearing stress from lingers tearing upward and tearing downward. Pinholes 21 also puncture along the longitudinal edges of the film 10 as a means for guiding a reference line to start tearing, means for fingers to catch and tear, means for the tearing across the tape, and means for having a straight line.

The puncture rotary die assembly 50 is a means of an assembly of puncture rotary die blades 51 sandwiched by a means of puncture rotary die 52, which are held and moved upon. The means of the puncture rotary die mounter 53, will support the means of the puncture rotary die assembly 50 as a spacer for more than one or two puncture rotary die blades 51, mounted on the shaft of the grooved puncture rotary die shaft 501 with gears and anchored with set screws, as shown in FIGS. 15-18. The puncture rotary die 52 can be assembled with the puncture rotary die blade 51, the puncture rotary die mounter 53, and the puncture rotary die holder 54.

Figure 15:
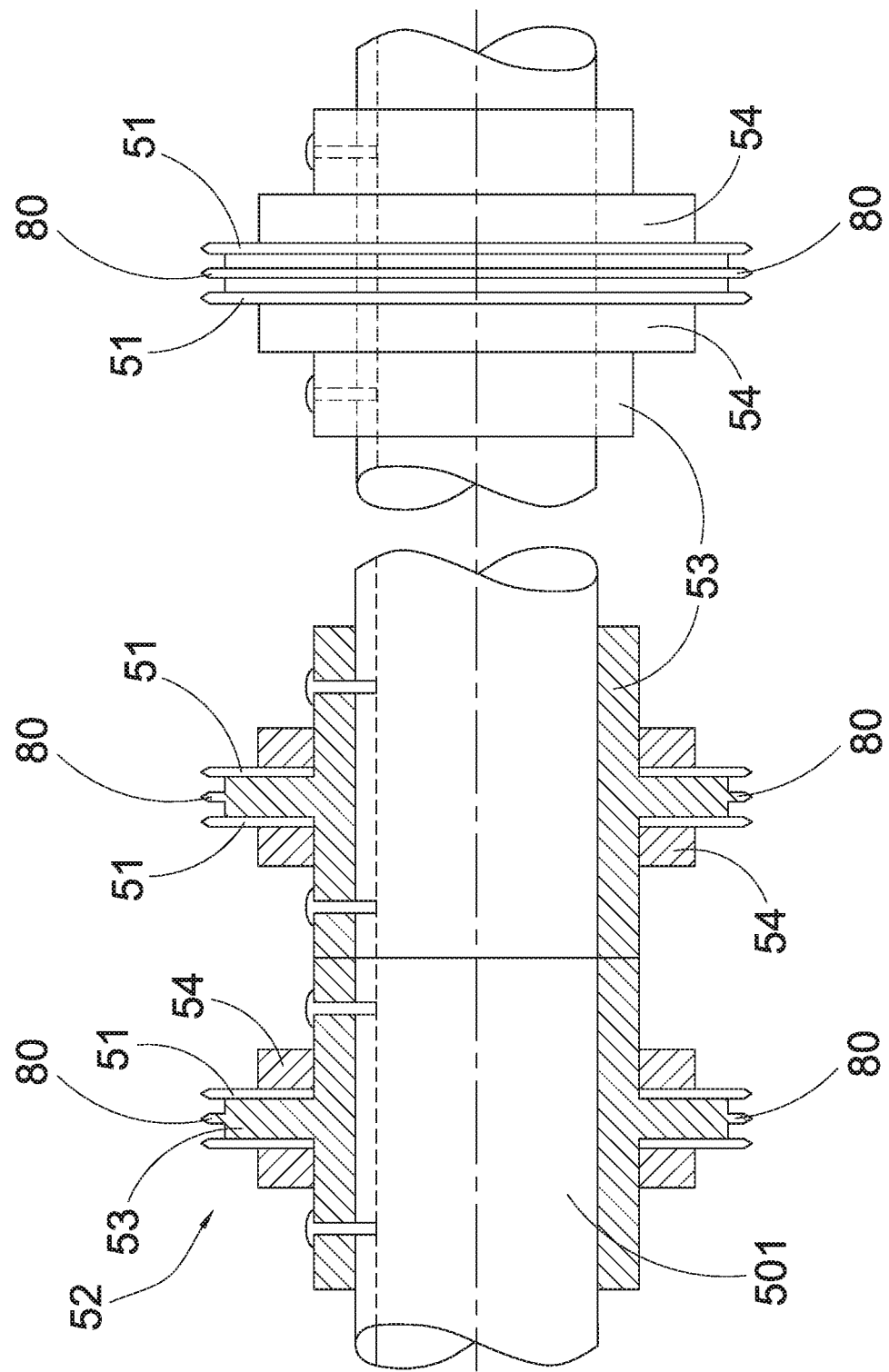
FIG. 15 illustrates the puncture rotary die assembly of the machine according to the above preferred embodiment of the present invention.

As shown in FIG. 15, each of the puncture rotary die blade 51 and the puncture rotary die holder 54 has a ring shape. The puncture rotary die blade 51 and the puncture rotary die holder 54 are coaxially mounted at the puncture rotary die mounter 53, wherein the puncture rotary die mounter 53 is coaxially mounted at the puncture rotary die shaft 501. It is worth mentioning that two or more puncture rotary die mounters 53 can be alignedly and coaxially mounted at the puncture rotary die shaft 501.

In particular, the puncture rotary die mounter 53 has a mounter slot 530 formed at a center thereof and a shoulder portion 531 protruded outwardly, wherein the puncture rotary die blade 51 and the puncture rotary die holder 54 are supported at the shoulder portion 531 of the puncture rotary die mounter 53. The puncture rotary die shaft 501 is coaxially extended through the mounter slot 530 of the puncture rotary die mounter 53, such that the puncture rotary die mounter 53 is coaxially supported at the puncture rotary die shaft 501.

Figure 17:
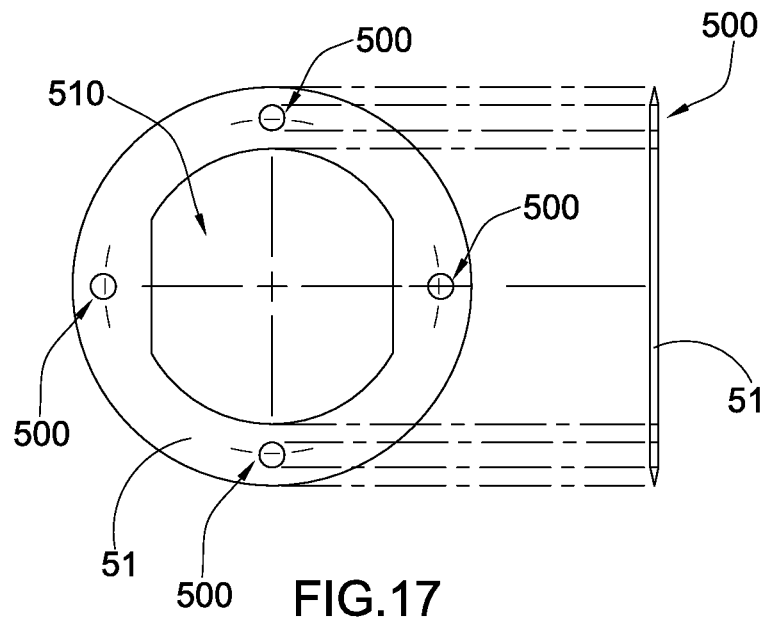
FIG. 17 illustrates the puncture rotary die blade of the machine according to the above preferred embodiment of the present invention.

The puncture rotary die blade 51 has a blade mounting slot 510 formed at a center thereof, as shown in FIG. 17. Likewise, the puncture rotary die holder 54 has a holder mounting slot 540 formed at a center thereof, as shown in FIG. 18. In order to mount the puncture rotary die blade 51 and the puncture rotary die holder 54, the shoulder portion 531 of the puncture rotary die mounter 53 is inserted through the blade mounting slot 510 of the puncture rotary die blade 51 and the holder mounting slot 540 of the puncture rotary die holder 54 in sequence, such that the puncture rotary die blade 51 is sandwiched and retained between the puncture rotary die holder 54 and the puncture rotary die mounter 53, as shown in FIG. 15. It is worth mentioning that a plurality of screw holes 500 are formed at the puncture rotary die blade 51, the puncture rotary die mounter 53, and the puncture rotary die holder 54. The screw holes 500 are correspondingly aligned with each other when the puncture rotary die blade 51, the puncture rotary die mounter 53, and the puncture rotary die holder 54 are assembled, such that the puncture rotary die blade 51, the puncture rotary die mounter 53, and the puncture rotary die holder 54 are securely mounted together by passing through a screw through the aligned screw holes 500 and coupling a nut to the screw.

Figure 16:
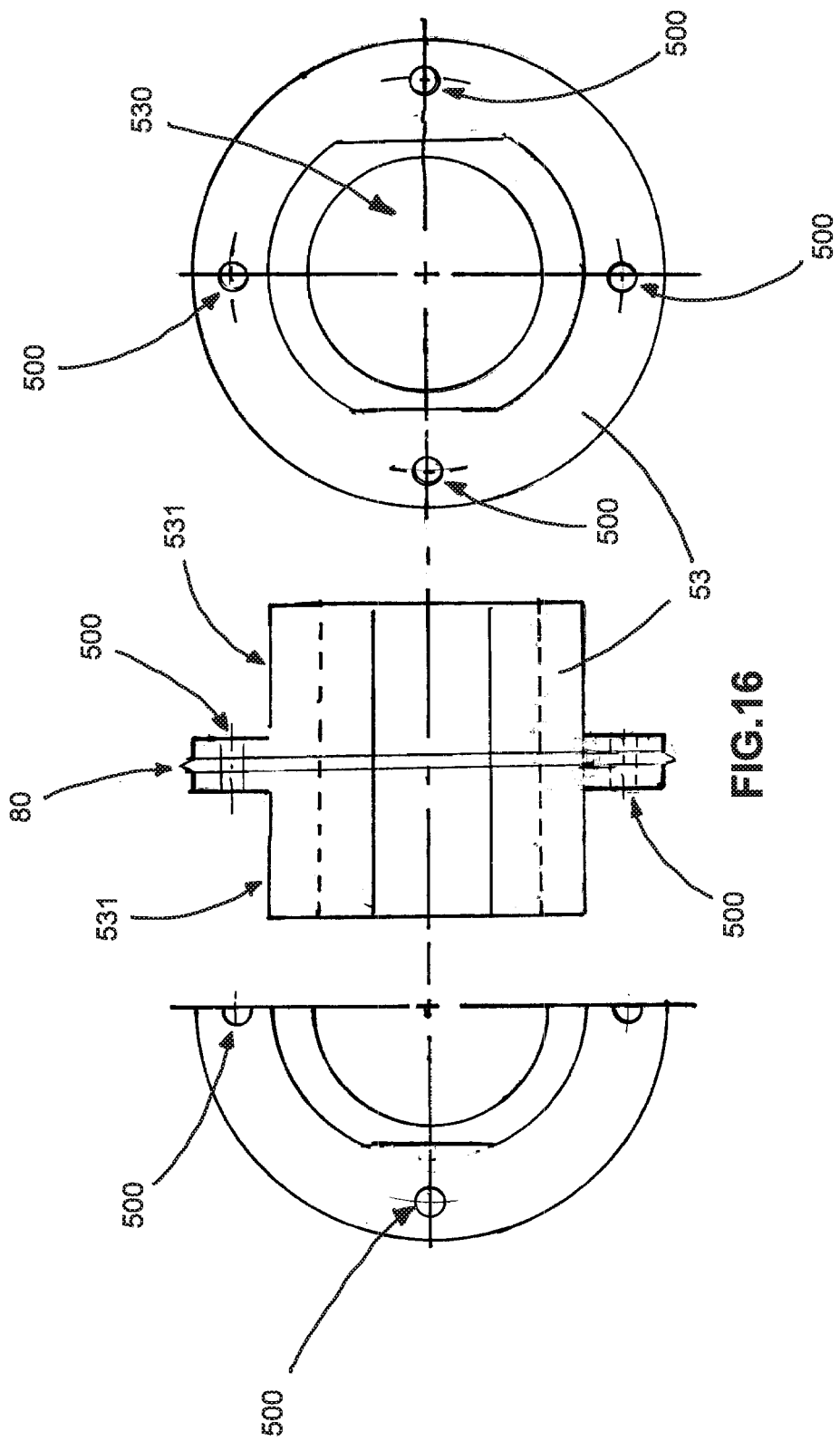
FIG. 16 illustrates the puncture rotary die mounter of the machine according to the above preferred embodiment of the present invention.

As shown in FIGS. 15 and 16, two shoulder portions 531 are opposedly protruded from the puncture rotary die mounter 53, wherein two sets of the puncture rotary die blades 51 and the puncture rotary die holders 54 are supported at the shoulder portions 531 of the puncture rotary die mounter 53 respectively. Accordingly, a cutter 80, such as the film cutter, can be built-in with the puncture rotary die mounter 53 to cut the jumbo film roll 70 into a plurality of films 10.

The cutter 80 is located adjacent to the shoulder portion 531 of the puncture rotary die mounter 53 to cut the jumbo film roll 70 at the same time when making the pinholes 21 thereon. In particular, the cutter 80 is located between two shoulder portions 531 of the puncture rotary die mounter 53, such that when the puncture rotary die blades 51 and the puncture rotary die holders 54 are supported at the shoulder portions 531 of the puncture rotary die mounter 53 respectively, the cutter 80 is supported between the puncture rotary die blades 51. Therefore, when passing the jumbo film roll 70 through the puncture rotary die assembly 50, two rows of pinholes 21 are formed along the jumbo film roll 70 by the puncture rotary die blades 51 respectively. At the same time, the jumbo film roll 70 is cut by the cutter 80 between the two rows of pinholes 21 to divide the jumbo film roll 70 into two films 10. In other words, when incorporating two or more puncture rotary dies 52 as shown in FIG. 15, a plurality of pinhole rows are formed on the jumbo film roll 70 and at the same time the jumbo film roll 70 is cut by the cutter 80 to form a plurality of films 10.

It is worth mentioning that the cross section of the mounter slot 530 of the puncture rotary die mounter 53 matches with the cross section of the puncture rotary die shaft 501. The non-circular cross section of the mounter slot 530 of the puncture rotary die mounter 53 can prevent any unwanted movement between the puncture rotary die mounter 53 and the puncture rotary die shaft 501.

Figure 16A:
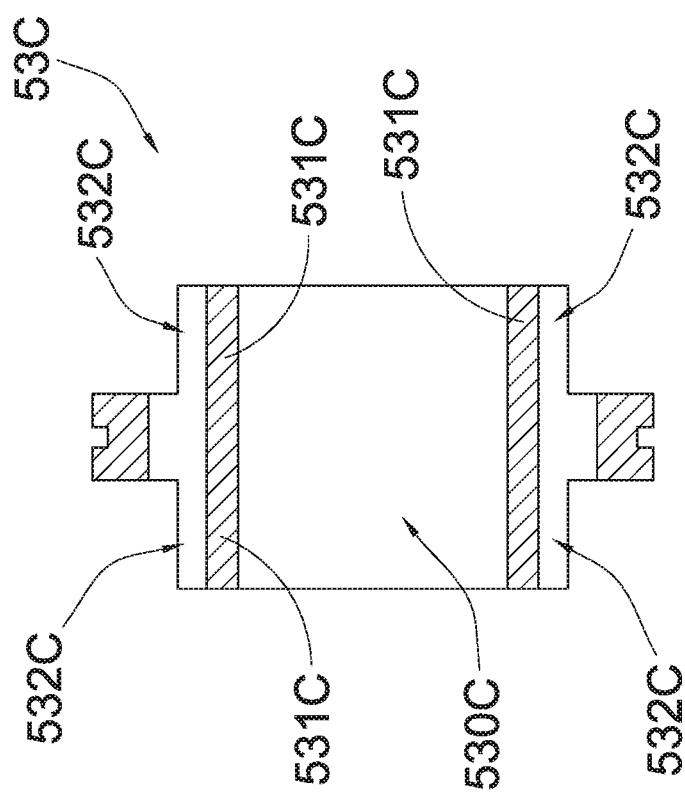
FIG. 16A illustrates an alternative mode of the puncture rotary die mounter of the machine according to the above preferred embodiment of the present invention.
Figure 16B:
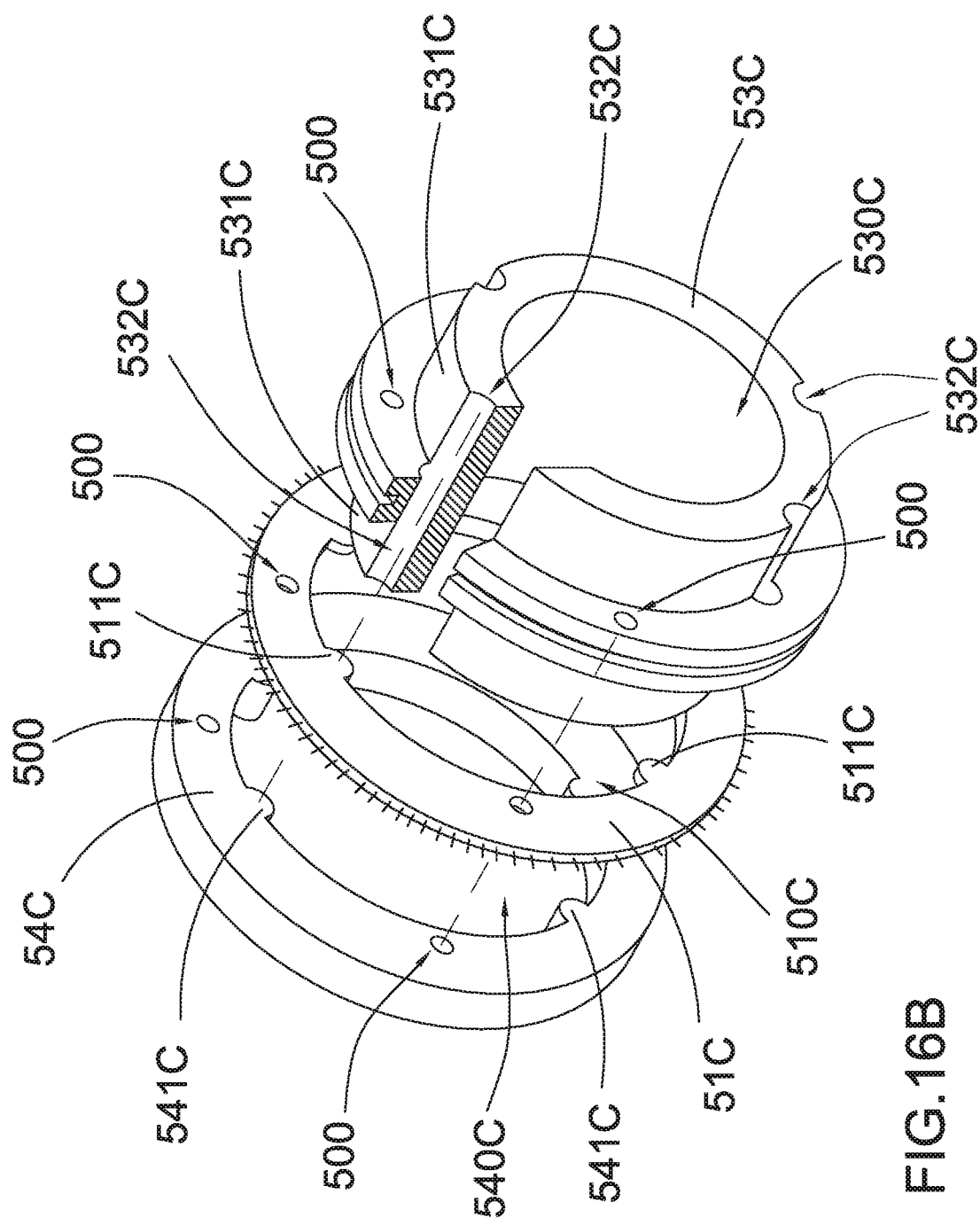
FIG. 16B is a partially perspective view of the alternative mode of the puncture rotary die mounter incorporating with the alternative modes of the puncture rotary die blade and the puncture rotary die blade according to the above preferred embodiment of the present invention.

It is worth mentioning that the puncture rotary die mounter 53C can have a radial mounting slot indently formed at a circumferential surface thereof between the two shoulder portions 531C, as shown in FIGS. 16A and 16B, wherein the cutter 80 can be coupled to the puncture rotary die mounter 53C at the radial mounting slot to retain the cutter 80 between two shoulder portions 531C of the puncture rotary die mounter 53C.

Figure 17A:
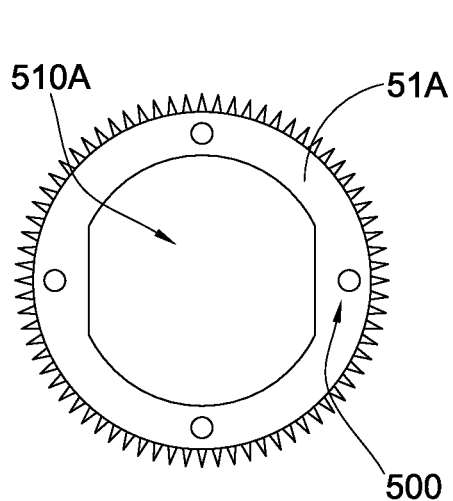
FIGS. 17A to 17C illustrate different alternative modes of the puncture rotary die blade of the machine according to the above preferred embodiment of the present invention.
Figure 17B:
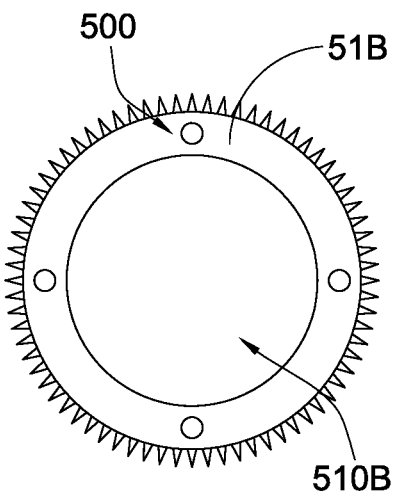

FIGS. 17A and 17B illustrate alternative mode of the puncture rotary die blade 51. Accordingly, the puncture rotary die blade 51 has a gear teeth structure to puncture the pinhole 21 on the film 10 as shown in FIG. 17. Alternatively, the puncture rotary die blade 51A, 51B can have a needle structure to puncture the pinhole 21 on the film 10 as shown in FIGS. 17A and 17B. The blade mounting slot 510A, 510B of the puncture rotary die blade 51A, 51B can be configured to match with the cross section of the shoulder portion 531 of the puncture rotary die mounter 53. The holder mounting slot 540B of the puncture rotary die holder 54 can be also configured to match with the blade mounting slot 510B of the puncture rotary die blade 51B. The non-circular cross section blade mounting slot 510 and the non-circular cross section holder mounting slot 540 match with the non-circular shoulder portion 531 of the puncture rotary die mounter 53, to prevent any unwanted movement among the puncture rotary die blade 51, the puncture rotary die holder 54, and the puncture rotary die mounter 53 and to ensure the alignment of the screw holes 500 of the puncture rotary die blade 51, the puncture rotary die mounter 53, and the puncture rotary die holder 54.

Figure 17C:
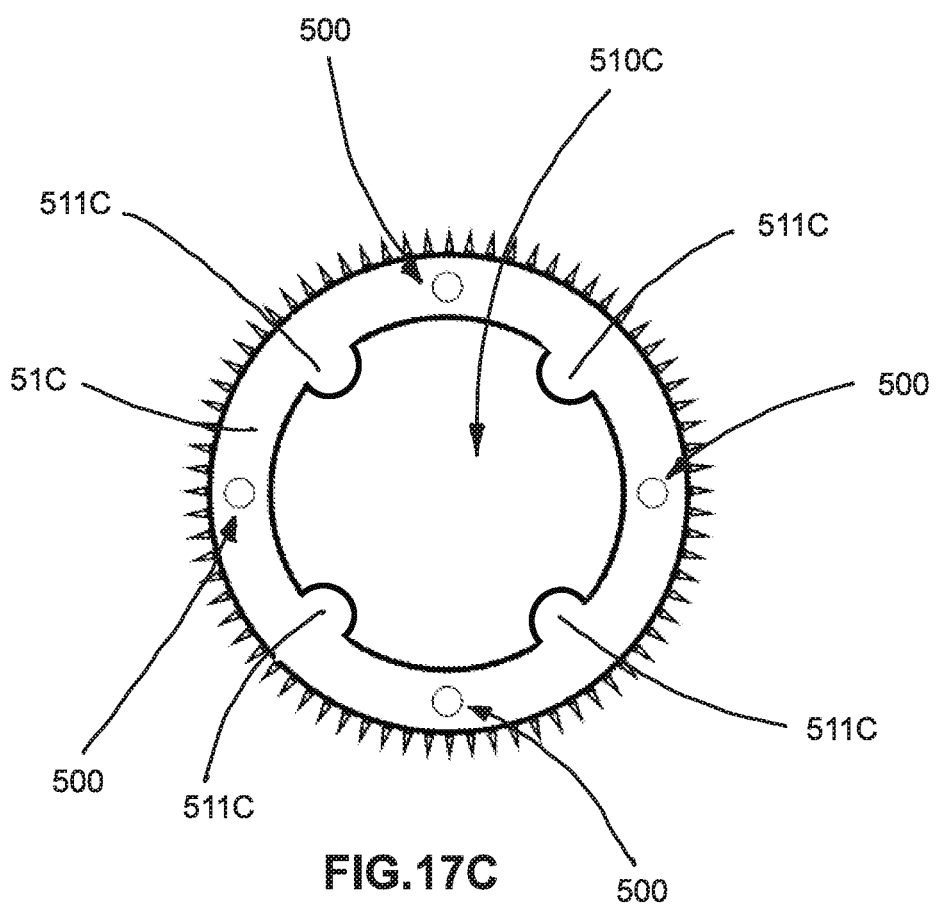

FIG. 17C illustrates another alternative mode of the puncture rotary die blade 51C which has the blade mounting slot 510C at the center thereof, wherein the blade mounting slot 510C has a circular configuration. The puncture rotary die blade 51C further has a plurality of blade studs 511C integrally and radially protruded from an inner edge within the blade mounting slot 510C. In other words, it is considered as a non-circular cross section of the blade mounting slot 510C with the blade studs 511C. Correspondingly, the puncture rotary die holder 54C has the holder mounting slot 540C at the center thereof and a plurality of holder studs 541C integrally and radially protruded from an inner edge within the holder mounting slot 540C, as shown in FIG. 18C. As shown in FIGS. 16A and 16B, the puncture rotary die mounter 53C has a shoulder portion 531C protruded outwardly, wherein the puncture rotary die blade 51C and the puncture rotary die holder 54C are supported at the shoulder portion 531C of the puncture rotary die mounter 53C. In particular, the puncture rotary die mounter 53C has a plurality of stud slots 532C indented on the shoulder portion 531, wherein the blade studs 511C of the puncture rotary die blade 51C and the holder studs 541C of the puncture rotary die holder 54C are slidably engaged with the stud slots 532C, to securely mount the puncture rotary die blade 51C and the puncture rotary die holder 54C at the shoulder portion 531C of the puncture rotary die mounter 53C, so as to prevent any unwanted movement among the puncture rotary die blade 51C, the puncture rotary die holder 54C, and the puncture rotary die mounter 53C. The engagement among the blade studs 511C, the holder studs 541C, and the stud slots 532C further ensures the alignment of the screw holes 500 of the puncture rotary die blade 51, the puncture rotary die mounter 53, and the puncture rotary die holder 54. Preferably, each of the blade studs 511C of the puncture rotary die blade 51C and the holder studs 541C of the puncture rotary die holder 54C has a semi-circular shape matching with the stud slot 532C having the semi-circular configuration.

The film 10 is designed with pinholes 21 along the longitudinal edge portions of the film 10, so both edges can be punctured by the puncture rotary die with a single row of pinholes, double row of pinholes, and/or triple row of pinholes. This also increases pinhole density and pinhole coverage.

The means of a single row pinholes 21, double row pinholes 21, and triple row of pinholes 21, is to increase the means of distribution area of the pinholes 21 and the means of tearing by fingers. The means of pinhole bridging is to shorten the connection between the pinholes, not only for the fingers to catch and rupture, but also as a means to create a tamper-evident effect. The means of pinhole bridging 22 also creates a means to strengthen the material around the pinhole 21 for support. The film 10 can be continuously punctured and slit along the upper tape edge and along the lower tape edge to generate a means of easy tearing function. Also together with the punctured pinhole coverage, it creates a tamper evident effect after boxes are taped, and a means for easy tearing and opening when boxes are received.

The pinhole rotary die is a means of puncturing a needle sized hole, it can also be pierced by laser and by static charges. The means of puncturing is also can be produced by a flat type puncturing die. The means of puncturing comes from the puncturing rotary die, which will puncture the jumbo film roll 70 before the coating with adhesive, or puncturing the jumbo film (adhesive-coated) roll after coating. The jumbo film adhesive-coated roll is the means of slitting and going through the puncture rotary die, and wound to a small tape roll. It is the means of allowing the jumbo film adhesive coated roll to feed through the means of the puncture rotary die and the means of the puncture rotary base die.

The film 10 is punctured by the puncture rotary die, created and designed with single row pinholes 21 of needle-sized puncher, or double row pinholes 21 of needle-sized puncher, or triple row pinholes 21 of needle-sized puncher. This allows the opportunity of stress concentration applied by fingers.

Figure 20:
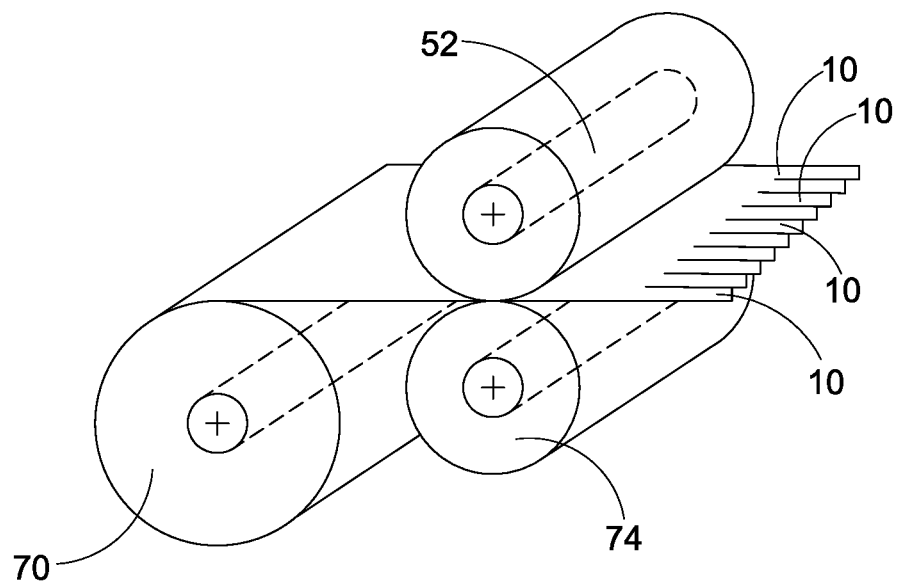
FIG. 20 illustrates the jumbo roll film passing through the gap between the puncture rotary base die and the puncture rotary die of the machine to form the film according to the above preferred embodiment of the present invention.

The puncture rotary die 52 is mounted by set screws on the puncture rotary die shaft 501, with gears on one side the shaft being grooved to allow the puncture rotary die 52 to shift and adjust to multiple positions. As shown in FIG. 20, the jumbo film roll 70 and jumbo film adhesive-coated roll can be punctured directly before film slitting to small tape rolls, or the films can be punctured directly after film slitting. It is worth mentioning that the slitting and puncturing processes can be performed at the same time to cut the jumbo film roll 70 into small tape rolls and to form the pinholes 21 on the small tape rolls at the same time.

Accordingly, the puncture rotary die 52 is rotatably engaged with the puncture rotary base die 74, wherein a gap is formed between the puncture rotary die 52 and the puncture rotary base die 74 for feeding the jumbo film (or the film 10) therethrough. Preferably, the puncture rotary die 52 is rotated for pressing on the non-adhesive surface of the jumbo film (or the film 10) and the puncture rotary base die 74 is rotated for pressing on the adhesive surface of the jumbo film (or the film 10). Then, the puncture rotary die 52 will puncture a plurality of pinholes 21 on the jumbo film (or the film 10) along a longitudinal direction thereof. In other words, the jumbo film is unrolled from the jumbo film roll 70 and cut into a plurality of films 10. The puncture process can be executed at the same time when the jumbo film is unrolled and cut to form the films 10. Alternatively, after the jumbo film is unrolled and cut to form a plurality of small tape rolls, the small tape rolls are unrolled to perform the puncture process and then rewind back to form the small tape rolls with pinholes 21 thereat.

The puncture rotary die 52 is designed against a left side pressure roller 71, right side pressure roller 72, and center pressure roller 73, with all three rollers 71, 72, 73 rotatably mounted on the same shaft 501 with set screws for tightening. The left side pressure roller 71 is held and pressed down by the left side adjustable pressure roller 701, the right side pressure roller 72 is held and pressed down by the right side adjustable pressure roller 702, and center pressure roller 73 is held and pressed down by the center pressure adjustable roller 703. Center pressure roller 73 is preferably applied on the longer pressure roller shaft 705 mounted to support multiple sets of puncture rotary dies. In other words, the pressure rollers 701, 702, 703 are rotatably supported by the pressure roller shaft 705. All pressure rollers 701, 702, 703 have screws with pressure adjustable handles 704 above, allowing adjustment of rollers 71, 72, 73 between the puncture rotary die 52 and puncture rotary base die 74 with pressure gap for plastic film feed through.

The puncture rotary die 52 rotates with the puncture rotary die shaft 501, with gears engaged and driven by the gears of the puncture rotary base die 74, and with gears which connect to chains 75 and motors 76, all which rotate the puncture rotary die 52 and gears, as shown in FIG. 14.

Figure 14A:
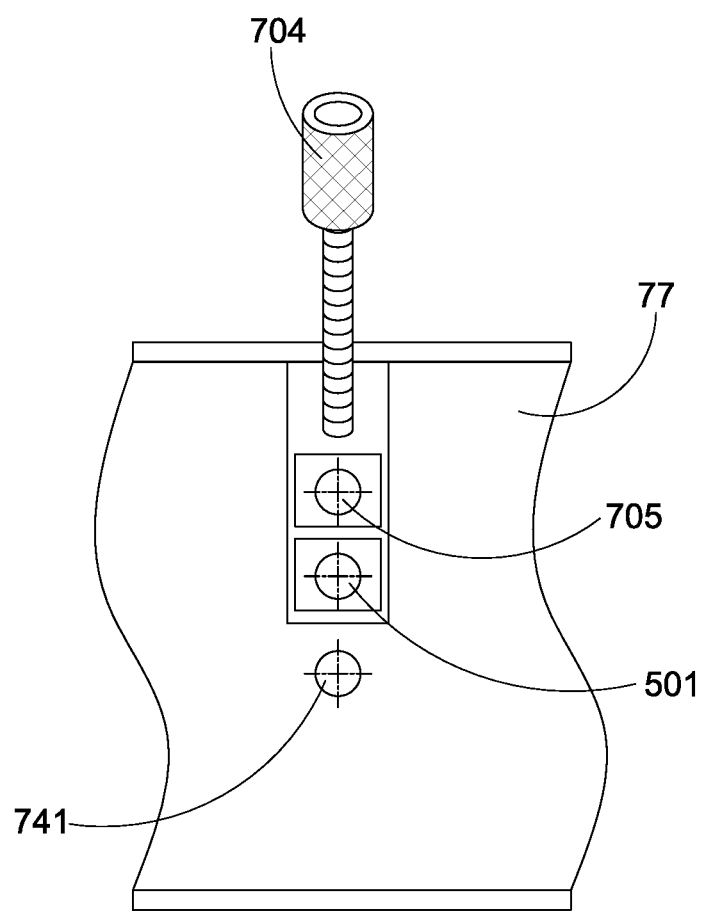
FIG. 14A illustrates a relationship among different shafts of the machine according to the above preferred embodiment of the present invention.
Figure 19:
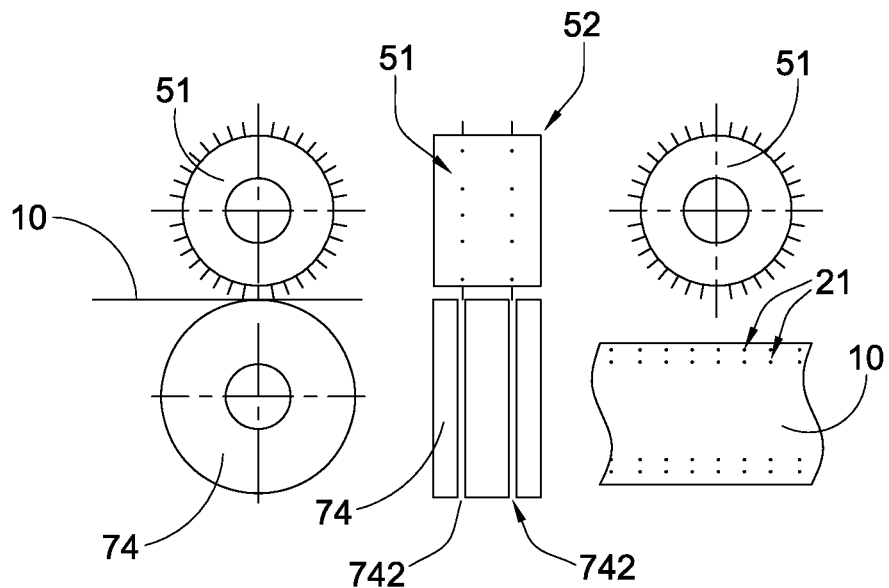
FIG. 19 illustrates the relationship between the puncture rotary base die and the puncture rotary die of the machine according to the above preferred embodiment of the present invention.

The puncture rotary die will puncture the BOPP plastic film, jumbo film roll 70, jumbo film adhesive coated roll, or small tape roll, which pass and run through the puncture rotary base die 74. The puncture rotary base die 74 is rotatably supported by a puncture rotary base die shaft (ANVIL) 741 with gear and is preferably made with hard rubber roller circumferential surface or grooved embossed metal rollers, and covered by a protective embossed plastic layer on the base die 74, creating an embossed layer to protect the sharpness of the needles on the puncture rotary die 52, and allow the adhesive coated film layer to pass through. In other words, the puncture rotary base die 74 has at least a groove 742 radially indented on a circumferential surface thereof to align with the puncture rotary die blade 51, as shown in FIG. 19. When two rows of pinholes 21 are needed to be formed on the film 10 along each longitudinal edge portion thereof, two puncture rotary die blades 51 are provided and two grooves 742 are provided at the puncture rotary base die 74 to puncture two rows of pinholes 21 along each longitudinal edge portion of the film 10, as shown in FIG. 19. It is worth mentioning that a radial distance between each two needles of the puncture rotary die blade 51 is a longitudinal distance between two pinholes 21 on the film 10. All rollers, puncture rotary die 52, puncture rotary die shaft 501, puncture rotary base die 74 are supported by a mounting frame 77, as shown in FIGS. 14 and 14A.

The puncture rotary base die 74 can also be engraved and grooved 742 as a female die, to receive puncture needles from the puncture rotary die and prevent needle damage during film puncture. The puncture rotary die 52 also can be replaced with laser puncture or electric static charge puncture.

According to the preferred embodiment, the stress tearable tape can be used as the following applications.

Replace Paper type's material Tape with bi-axially oriented polypropylene (BOPP) material made tape: such as Masking tape, Kraft paper tape, and Painter's tape. All these tapes are very costly, they cost 2 to 3 times more than the tape of the present invention made of BOPP. Simply because the film 10 has the hand tearing arrangement 20, which enables the tape of the present invention to replace the Masking tape, Kraft papers tape, Painters tape, and water-activated reinforced gum tape. These tapes all can be replaced. It is very inexpensive that it can be half price of the conventional paper tape.

Figure 21:
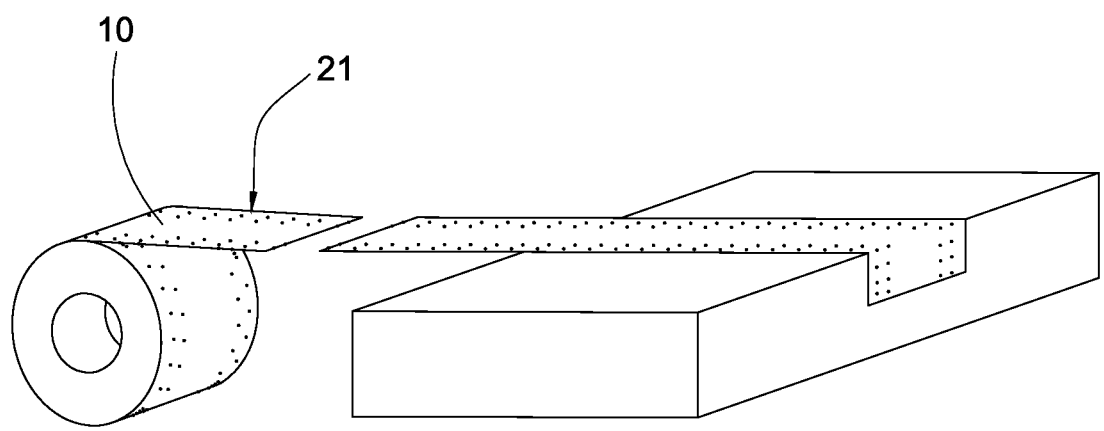
FIG. 21 illustrates the stress tearable tape being used as a box sealing tape according to the above preferred embodiment of the present invention.

Carton sealing: Boxes (such as shipping containers) can be sealed by the film 10 equipped with the hand tearing arrangement 20 for easy tear by hand purpose and function, as shown in FIG. 21. Sealing boxes with small tape roll simply with hand tearing, use fingers tearing upward and tearing downward on the pinholes 21 without any tooling such as tape dispenser, knife, scissors or any sharp tool such as teeth. Stress will concentrate on the pinholes 21 and rupture across the film 10.

Figure 22A:
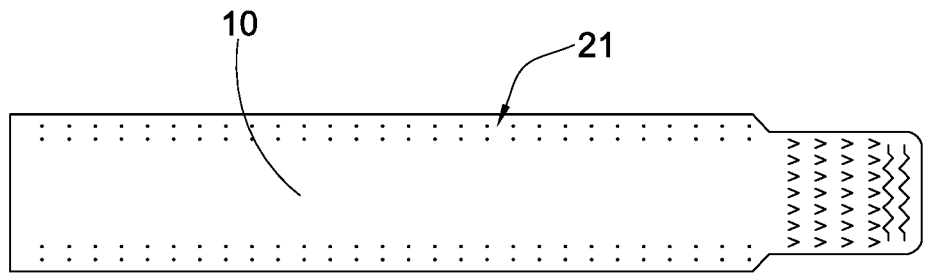
FIGS. 22A to 22C illustrate the stress tearable tape being used as an arm band according to the above preferred embodiment of the present invention.
Figure 22B:
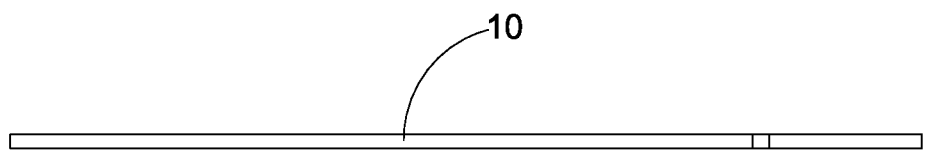
Figure 22C:
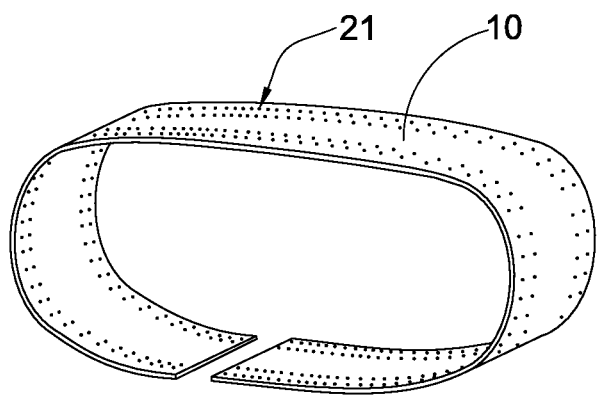

Arm band: Hospital patient arm bands, as shown in FIGS. 22A to 22C, can also be punctured with pinholes 21 along the upper tape edge and lower tape edge, allowing staff to use the right hand fingers and left hand fingers together and simply tear upward or downward on the pinhole position to separate the patient arm band, instead of cutting with scissors. Accordingly, the film 10 has two free ends detachably coupled with each other to form the arm band. In other words, nurse can tearing with left hand finger, right hand finger together to capture the pinholes 21 along the upper tape edge or along the lower tape edge and break the arm band without using the scissors.

Grocery bag of food bag application: End user can simply tear the "the hand tearing arrangement 20" on the food bag edge to open the bag and reach the food.

Grocery or fruit containers: End user can tear the tape and open the multiple taped fruit tray type fruit container and reached the product easily with no tool needed by simply tearing the film 10 with the hand tearing arrangement 20.

Tamper evident function: When the pinhole distribution area provides plenty of pinhole coverage area on the film 10 of small tape roll and when people try to peel it off from the sealed area, the hand tearing arrangement 20 will rupture easy at the pinhole bridging 22, the slit edge 23 and proof that the shipment has tampered.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A stress tearable tape adapted for a user to tear to cut in a transverse direction thereof by finger tips of the user, comprising:
    an elongated film having a non-adhesive surface and an opposed adhesive surface, and defining a longitudinal direction and a transverse direction, wherein said film has a thickness of 0.001 to 0.003 inch and two longitudinal edge portions along said longitudinal direction;
    a plurality of pinholes closely and spacedly formed and extended along at least one of said longitudinal edge portions of said film to form at least a row of said plurality of pinholes, wherein a distance between each two of said plurality of pinholes along said longitudinal edge portion is the same and a barrier portion is defined between said row of said plurality of pinholes and a longitudinal edge of said film, wherein said barrier portion has a width of 0.01 to 0.2 inch, wherein each of said plurality of pinholes is a through hole, penetrating from said non-adhesive surface to said adhesive surface of said film, having a diameter of 0.001 to 0.1 inch at said non-adhesive surface which gradually reduces towards said adhesive surface of said film and is smaller than a distance of 0.05 to 0.2 inch between every two adjacent pinholes of said plurality of pinholes for enabling one of the finger tips of the user to cover at least two of said plurality of pinholes along said longitudinal direction so as to tear said film by hand with a force starting at one of said at least two pinholes of said plurality of pinholes caught and cover by the finger tip of the user to cut said film along said transverse direction, wherein a diameter of each of said pinholes is smaller than a distance between every said two adjacent pinholes of said plurality of pinholes.

2. The stress tearable tape, as recited in claim 1, wherein two or more of said plurality of pinholes are circular through holes each having a conical shape.

3. The stress tearable tape, as recited in claim 2, wherein said plurality of pinholes is closely and spacedly formed and extended along said one of said longitudinal edge portions of said film to form a pair of parallel rows of said plurality of pinholes, wherein a distance between said a pair of parallel rows of said plurality of pinholes is 0.05 to 0.2 inch.

4. The stress tearable tape, as recited in claim 2, further comprising an adhesive layer formed on said adhesive surface of said film.

5. The stress tearable tape, as recited in claim 4, wherein said plurality of pinholes is closely and spacedly formed and extended along said one of said longitudinal edge portions of said film to form a pair of parallel rows of said plurality of pinholes, wherein a distance between said a pair of parallel rows of said plurality of pinholes is 0.05 to 0.2 inch.

6. The stress tearable tape, as recited in claim 4, wherein said plurality of pinholes penetrates through both said film and said adhesive layer.

7. The stress tearable tape, as recited in claim 6, wherein said plurality of pinholes is closely and spacedly formed and extended along said one of said longitudinal edge portions of said film to form a pair of parallel rows of said plurality of pinholes, wherein a distance between said a pair of parallel rows of said plurality of pinholes is 0.05 to 0.2 inch.

8. The stress tearable tape, as recited in claim 1, wherein two or more of said plurality of pinholes are through holes each having a rectangular shape, wherein said diameter of each of said rectangular shaped pinholes is a width thereof, and said distance between each two of said rectangular shaped pinholes is defined as a distance between two transverse edges of said two rectangular shaped pinholes and said distance between said longitudinal edge of said film and each of said rectangular shaped pinholes is defined as a distance between said longitudinal edge of said film and a longitudinal edge of said rectangular shaped pinhole.

9. The stress tearable tape, as recited in claim 8, wherein said plurality of pinholes is closely and spacedly formed and extended along said one of said longitudinal edge portions of said film to form a pair of parallel rows of said plurality of pinholes, wherein a distance between said a pair of parallel rows of said plurality of pinholes is 0.05 to 0.2 inch.

10. The stress tearable tape, as recited in claim 8, further comprising an adhesive layer formed on said adhesive surface of said film.

11. The stress tearable tape, as recited in claim 10, wherein said plurality of pinholes is closely and spacedly formed and extended along said one of said longitudinal edge portions of said film to form a pair of parallel rows of said plurality of pinholes, wherein a distance between said a pair of parallel rows of said plurality of pinholes is 0.05 to 0.2 inch.

12. The stress tearable tape, as recited in claim 10, wherein said plurality of pinholes penetrates through both said film and said adhesive layer.

13. The stress tearable tape, as recited in claim 12, wherein said plurality of pinholes is closely and spacedly formed and extended along said one of said longitudinal edge portions of said film to form a pair of parallel rows of said plurality of pinholes, wherein a distance between said a pair of parallel rows of said plurality of pinholes is 0.05 to 0.2 inch.

14. The stress tearable tape, as recited in claim 1, further comprising an adhesive layer formed on said adhesive surface of said film.

15. The stress tearable tape, as recited in claim 14, wherein said plurality of pinholes is closely and spacedly formed and extended along said one of said longitudinal edge portions of said film to form a pair of parallel rows of said plurality of pinholes, wherein a distance between said a pair of parallel rows of said plurality of pinholes is 0.05 to 0.2 inch.

16. The stress tearable tape, as recited in claim 14, wherein said plurality of pinholes penetrates through both said film and said adhesive layer.

17. The stress tearable tape, as recited in claim 16, wherein said plurality of pinholes is closely and spacedly formed and extended along said one of said longitudinal edge portions of said film to form a pair of parallel rows of said plurality of pinholes, wherein a distance between said a pair of parallel rows of said plurality of pinholes is 0.05 to 0.2 inch.

18. The stress tearable tape, as recited in claim 1, wherein said plurality of pinholes is closely and spacedly formed and extended along said one of said longitudinal edge portions of said film to form a pair of parallel rows of said plurality of pinholes, wherein a distance between said a pair of parallel rows of said plurality of pinholes is 0.05 to 0.2 inch.

19. A stress tearable tape adapted for a user to tear to cut in a transverse direction thereof by hands of the user, comprising:
    an elongated film having a non-adhesive surface and an opposed adhesive surface, and defining a longitudinal direction and a transverse direction, wherein said film has a thickness of 0.001 to 0.003 inch;
    a plurality of pinholes closely and spacedly formed and extended along a centerline of said film longitudinally to form at least a row of said plurality of pinholes, wherein a distance between each two of said plurality of pinholes along said centerline is the same, wherein each of said plurality of pinholes is a through hole, penetrating from said non-adhesive surface to said adhesive surface of said film, having a diameter of 0.001 to 0.1 inch at said non-adhesive surface which gradually reduces towards said adhesive surface of said film and is smaller than a distance of 0.05 to 0.2 inch between every two adjacent pinholes of said plurality of pinholes for enabling the user to apply a leftward pulling force and a rightward pulling force by the hands of the user along said longitudinal direction until a shearing stress is created to reach a rupture point on one of said plurality of pinholes that is perpendicular to the leftward pulling force and the rightward pulling force to rupture and tear upwards and downwards on said one of said plurality of pinholes perpendicularly, wherein a diameter of each of said pinholes is smaller than a distance between every said two adjacent pinholes of said plurality of pinholes.

20. The stress tearable tape, as recited in claim 19, wherein two or more of said plurality of pinholes are circular through holes each having a conical shape.

21. The stress tearable tape, as recited in claim 20, wherein said plurality of pinholes is closely and spacedly formed and extended along said centerline of said film longitudinally to form a pair of parallel rows of said plurality of pinholes, wherein a distance between said a pair of parallel rows of said plurality of pinholes is 0.05 to 0.2 inch.

22. The stress tearable tape, as recited in claim 20, further comprising an adhesive layer formed on said adhesive surface of said film.

23. The stress tearable tape, as recited in claim 22, wherein said plurality of pinholes is closely and spacedly formed and extended along said centerline of said film longitudinally to form a pair of parallel rows of said plurality of pinholes, wherein a distance between said a pair of parallel rows of said plurality of pinholes is 0.05 to 0.2 inch.

24. The stress tearable tape, as recited in claim 22, wherein said plurality of pinholes penetrates through both said film and said adhesive layer.

25. The stress tearable tape, as recited in claim 24, wherein said plurality of pinholes is closely and spacedly formed and extended along said centerline of said film longitudinally to form a pair of parallel rows of said plurality of pinholes, wherein a distance between said a pair of parallel rows of said plurality of pinholes is 0.05 to 0.2 inch.

26. The stress tearable tape, as recited in claim 19, wherein two or more of said plurality of pinholes are through holes each having a rectangular shape, wherein said diameter of each of said rectangular shaped pinholes is a width thereof, and said distance between each two of said rectangular shaped pinholes is defined as a distance between two transverse edges of said two rectangular shaped pinholes and said distance between said longitudinal edge of said film and each of said rectangular shaped pinholes is defined as a distance between said longitudinal edge of said film and a longitudinal edge of said rectangular shaped pinhole.

27. The stress tearable tape, as recited in claim 26, wherein said plurality of pinholes is closely and spacedly formed and extended along said centerline of said film longitudinally to form a pair of parallel rows of said plurality of pinholes, wherein a distance between said a pair of parallel rows of said plurality of pinholes is 0.05 to 0.2 inch.

28. The stress tearable tape, as recited in claim 26, further comprising an adhesive layer formed on said adhesive surface of said film.

29. The stress tearable tape, as recited in claim 28, wherein said plurality of pinholes is closely and spacedly formed and extended along said centerline of said film longitudinally to form a pair of parallel rows of said plurality of pinholes, wherein a distance between said a pair of parallel rows of said plurality of pinholes is 0.05 to 0.2 inch.

30. The stress tearable tape, as recited in claim 28, wherein said plurality of pinholes penetrates through both said film and said adhesive layer.

31. The stress tearable tape, as recited in claim 30, wherein said plurality of pinholes is closely and spacedly formed and extended along said centerline of said film longitudinally to form a pair of parallel rows of said plurality of pinholes, wherein a distance between said a pair of parallel rows of said plurality of pinholes is 0.05 to 0.2 inch.

32. The stress tearable tape, as recited in claim 19, further comprising an adhesive layer formed on said adhesive surface of said film.

33. The stress tearable tape, as recited in claim 32, wherein said plurality of pinholes is closely and spacedly formed and extended along said centerline of said film longitudinally to form a pair of parallel rows of said plurality of pinholes, wherein a distance between said a pair of parallel rows of said plurality of pinholes is 0.05 to 0.2 inch.

34. The stress tearable tape, as recited in claim 32, wherein said plurality of pinholes penetrates through both said film and said adhesive layer.

35. The stress tearable tape, as recited in claim 34, wherein said plurality of pinholes is closely and spacedly formed and extended along said centerline of said film longitudinally to form a pair of parallel rows of said plurality of pinholes, wherein a distance between said a pair of parallel rows of said plurality of pinholes is 0.05 to 0.2 inch.

36. The stress tearable tape, as recited in claim 19, wherein said plurality of pinholes is closely and spacedly formed and extended along said centerline of said film longitudinally to form a pair of parallel rows of said plurality of pinholes, wherein a distance between said a pair of parallel rows of said plurality of pinholes is 0.05 to 0.2 inch.

* * * * *